US011843519B2

(12) United States Patent
Fukami et al.

(10) Patent No.: US 11,843,519 B2
(45) Date of Patent: Dec. 12, 2023

(54) NETWORK MANAGEMENT APPARATUS, METHOD, AND PROGRAM

(71) Applicant: NIPPON TELEGRAPH AND TELEPHONE CORPORATION, Tokyo (JP)

(72) Inventors: Kimihiko Fukami, Musashino (JP); Masataka Sato, Musashino (JP); Shohei Nishikawa, Musashino (JP); Kenji Murase, Musashino (JP); Kenichi Tayama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/787,839

(22) PCT Filed: Dec. 26, 2019

(86) PCT No.: PCT/JP2019/051316
§ 371 (c)(1),
(2) Date: Jun. 21, 2022

(87) PCT Pub. No.: WO2021/131002
PCT Pub. Date: Jul. 1, 2021

(65) Prior Publication Data

US 2023/0025536 A1 Jan. 26, 2023

(51) Int. Cl.
*H04L 41/0604* (2022.01)
*H04L 41/0631* (2022.01)
*H04L 41/00* (2022.01)

(52) U.S. Cl.
CPC .......... *H04L 41/26* (2013.01); *H04L 41/0627* (2013.01); *H04L 41/0631* (2013.01)

(58) Field of Classification Search
CPC .. H04L 41/26; H04L 41/0627; H04L 41/0631
(Continued)

(56) References Cited

U.S. PATENT DOCUMENTS 9,866,443 B1 * 1/2018 Shih ...................... H04L 69/324
10,560,309 B1 * 2/2020 Chitalia .................. H04L 41/40
(Continued)

OTHER PUBLICATIONS

Kimihiko Fukami et al., Study on Method of Identifying Service Influence Occurred by Network Fault, IEICE Technical Report, vol. 118, No. 483, 2019, pp. 13-18.
(Continued)

*Primary Examiner* — Melvin H Pollack
(74) *Attorney, Agent, or Firm* — Harness, Dickey & Pierce, P.L.C.

(57) ABSTRACT

A network management apparatus according to an embodiment includes: a storage device configured to store information indicating a correspondence relationship between information objects related to a logical layer, information objects related to a physical layer in a network configuration, and information objects related to a facility layer which are objects in which the information objects related to the physical layer are housed; an acquisition unit configured to acquire an information object related to an occurrence path of a failure in the logical layer of the network configuration, from the storage device; and a search unit configured to search for, among the information objects related to the facility layer stored in the storage device, an information object related to the facility layer and the physical layer associated with the information object related to the occurrence path of the failure acquired from the acquisition unit, as a candidate for a facility that causes the failure.

9 Claims, 33 Drawing Sheets

(58) Field of Classification Search
USPC .......................................................... 709/223
See application file for complete search history.

(56) References Cited

U.S. PATENT DOCUMENTS

| | | | | |
|---|---|---|---|---|
| 10,805,144 | B1 * | 10/2020 | Gangadharan | H04L 41/046 |
| 10,812,319 | B1 * | 10/2020 | Prakash | H04L 41/046 |
| 10,985,970 | B1 * | 4/2021 | Goyal | G06F 16/2477 |
| 11,140,200 | B1 * | 10/2021 | A | H04L 41/0627 |
| 2016/0344772 | A1 * | 11/2016 | Monahan | G06F 16/248 |
| 2017/0026292 | A1 * | 1/2017 | Smith | H04L 43/16 |
| 2017/0104651 | A1 * | 4/2017 | Kakadia | H04L 43/04 |
| 2017/0126476 | A1 * | 5/2017 | Curtin | H04L 41/5009 |
| 2017/0308422 | A1 * | 10/2017 | Golash | G06F 11/079 |
| 2017/0317899 | A1 * | 11/2017 | Taylor | H04L 12/2854 |
| 2018/0091401 | A1 * | 3/2018 | Richards | H04L 61/4511 |
| 2018/0367373 | A1 * | 12/2018 | Chou | H04L 43/16 |
| 2018/0367412 | A1 * | 12/2018 | Sethi | H04L 43/20 |
| 2019/0132190 | A1 * | 5/2019 | Jeyakumar | H04L 41/0631 |
| 2019/0319845 | A1 * | 10/2019 | Zhu | H04L 45/306 |
| 2019/0356535 | A1 * | 11/2019 | Li | H04L 41/0631 |
| 2020/0159380 | A1 * | 5/2020 | Wadikar | H04L 41/0631 |
| 2020/0177469 | A1 * | 6/2020 | Kercheville | H04L 41/149 |
| 2020/0252262 | A1 * | 8/2020 | Cao Minh | H04L 41/065 |
| 2020/0295984 | A1 * | 9/2020 | Qian | H04L 41/0853 |
| 2020/0322242 | A1 * | 10/2020 | Malysh | H04L 43/028 |
| 2021/0160263 | A1 * | 5/2021 | Jiang | H04L 43/087 |
| 2021/0182358 | A1 * | 6/2021 | Jalal | G06F 11/0709 |

OTHER PUBLICATIONS

Ryusei Arai et al., Building causal relation model for root cause analysis of IP-over-Fiber multilayer network, IEICE Technical Report, vol. 117, No. 459, 2019, pp. 171-174.

* cited by examiner

Fig. 1

| LAYER TYPE | Entity NAME | MEANING | ATTRIBUTE | DESCRIPTION |
| --- | --- | --- | --- | --- |
| FACILITY | PS (Physical Structure) | FACILITY SUCH AS BUILDING, MANHOLE, AND THE LIKE | status | ATTRIBUTE INDICATING STATUS OF PS Entity NORMAL: true, FAILURE: false |
| | | | pdList | ARRAY OF PD Entities THAT PS Entity HAS |
| | | | asList | ARRAY OF AS Entities THAT PS Entity HAS |
| | | | position | TWO-DIMENSIONAL COORDINATES INDICATING POSITION OF PS Entity |
| | AS (Aggregate Section) | CABLE, LINE, CABLE TUNNEL | status | ATTRIBUTE INDICATING STATUS OF AS Entity NORMAL: true, FAILURE: false |
| | | | plList | ARRAY OF PL Entities THAT AS Entity HAS |
| | | | position | TWO-DIMENSIONAL COORDINATES INDICATING POSITION OF AS Entity |

Fig. 2

| LAYER TYPE | Entity NAME | MEANING | ATTRIBUTE | DESCRIPTION |
|---|---|---|---|---|
| PHYSICAL | PD (Physical Device) | DEVICE | status | ATTRIBUTE INDICATING STATUS OF PD Entity NORMAL OPERATION: true, ABNORMAL OPERATION: false |
| | | | ppList | ARRAY OF PP Entities THAT PD Entity HAS |
| | | | position | TWO-DIMENSIONAL COORDINATES INDICATING POSITION OF PD Entity |
| | PP (Physical Port) | COMMUNICATION PORT THAT DEVICE HAS | status | ATTRIBUTE INDICATING STATUS OF PP Entity NORMAL OPERATION: true, ABNORMAL OPERATION: false |
| | | | position | TWO-DIMENSIONAL COORDINATES INDICATING POSITION OF PD Entity |
| | PL (Physical Link) | CORE WIRE OF CABLE | status | ATTRIBUTE INDICATING STATUS OF PL Entity NORMAL OPERATION: true, ABNORMAL OPERATION: false |
| | | | pcList | ARRAY OF PC Entities THAT PL Entity HAS |
| | PC (Physical Connector) | CONNECTOR FOR CONNECTION OF CABLE | status | ATTRIBUTE INDICATING STATUS OF PC Entity NORMAL OPERATION: true, ABNORMAL OPERATION: false |
| | | | ppList | ARRAY OF PP Entities THAT PC Entity HAS |

Fig. 3

| LAYER TYPE | Entity NAME | MEANING | ATTRIBUTE | DESCRIPTION |
|---|---|---|---|---|
| LOGICAL (Logical Device LAYER) | TL (Topological Link) | CONNECTIVITY BETWEEN DEVICES (WITHIN Logical Device LAYER) | endPointList | ARRAY OF TPE Entities THAT CONSTITUTES TL Entity |
| | | | status | ATTRIBUTE INDICATING STATUS OF TL Entity NORMAL OPERATION: true, ABNORMAL OPERATION: false |
| | NFD (Network Fowarding Domain) | TRANSFERABLE RANGE WITHIN DEVICE (WITHIN Logical Device LAYER) | endPointList | ARRAY OF TPE Entities THAT CONSTITUTES NFD Entity |
| | | | status | ATTRIBUTE INDICATING STATUS OF NFD Entity NORMAL OPERATION: true, ABNORMAL OPERATION: false |
| | TPE (Termination Point Encapsulation) | TERMINATION POINT OF COMMUNICATION | tpeRefList | ARRAY OF TPE Entities HAVING CORRESPONDING TPE Entities OF LOWER LAYER (NUMBER OF ARRAYS IS ONE IN EXAMPLE) |
| | | | ppRefList | ARRAY OF PP Entities CORRESPONDING TO TPE Entity (NUMBER OF ARRAYS IS ONE IN EXAMPLE) |
| | | | status | ATTRIBUTE INDICATING STATUS OF TPE Entity NORMAL OPERATION: true, ABNORMAL OPERATION: false |
| | | | layerName | LAYER NAME |

Fig. 4

| LAYER TYPE | Entity NAME | | MEANING | ATTRIBUTE | DESCRIPTION |
|---|---|---|---|---|---|
| LOGICAL (COMMUNICATION LAYER) | FRE (Forwarding Relationship Encapsulation) | LC (Link Connect) | CONNECTIVITY BETWEEN DEVICES (WITHIN COMMUNICATION LAYER) | endPointList | ARRAY OF TPE Entities THAT CONSTITUTES LC Entity |
| | | | | status | ATTRIBUTE INDICATING STATUS OF LC Entity NORMAL OPERATION: true, ABNORMAL OPERATION: false |
| | | | | layerName | LAYER NAME |
| | | XC (Cross(X) Connect) | CONNECTIVITY BETWEEN DEVICES (WITHIN COMMUNICATION LAYER) | endPointList | ARRAY OF TPE Entities THAT CONSTITUTES XC Entity |
| | | | | status | ATTRIBUTE INDICATING STATUS OF XC Entity NORMAL OPERATION: true, ABNORMAL OPERATION: false |
| | | | | layerName | LAYER NAME |
| | | NC (Network Connect) | End-End CONNECTIVITY FORMED BY LC AND XC (WITHIN COMMUNICATION LAYER) | endPointList | ARRAY OF TPE Entities THAT CONSTITUTES LC AND XC |
| | | | | status | ATTRIBUTE INDICATING STATUS OF NC Entity NORMAL OPERATION: true, ABNORMAL OPERATION: false |
| | | | | userList | CHARACTER STRING ARRAY THAT HOLDS SUBSCRIBER NAME OR URL OF IF THAT ACQUIRES SUBSCRIBER NAME |
| | | | | layerName | LAYER NAME |

Fig. 10

| PROCEDURE | FRE(LC)_OTN_1 | FRE(LC)_OTN_2 | FRE(LC)_OTN_3 |
|---|---|---|---|
| (1) | TPE_OTN_1<br>TPE_OTN_2 | TPE_OTN_3<br>TPE_OTN_4 | TPE_OTN_5<br>TPE_OTN_6 |
| (2) | PP_OTN_1<br>PP_OTN_2 | PP_OTN_3<br>PP_OTN_4 | PP_OTN_5<br>PP_OTN_6 |
| (3) | PD_OTN_1<br>PD_OTN_2 | PD_OTN_3<br>PD_OTN_4 | PD_OTN_5<br>PD_OTN_6 |
| (4) | PS_B<br>PS_C | PS_A<br>PS_D | PS_A<br>PS_F |
| (5) | PL_OTN_1 | PL_OTN_2 | PL_OTN_3 |
| (6) | AS_1 | AS_2 | AS_2<br>AS_3 |

Fig. 12

| PROCEDURE | FRE(LC)_OTN_1 | FRE(LC)_OTN_2 | FRE(LC)_OTN_3 |
| --- | --- | --- | --- |
| (1) | TPE_OTN_1<br>TPE_OTN_2 | TPE_OTN_3<br>TPE_OTN_4 | TPE_OTN_5<br>TPE_OTN_6 |
| (2) | PP_OTN_1<br>PP_OTN_2 | PP_OTN_3<br>PP_OTN_4 | PP_OTN_5<br>PP_OTN_6 |
| (3) | PD_OTN_1<br>PD_OTN_2 | PD_OTN_3<br>PD_OTN_4 | PD_OTN_5<br>PD_OTN_6 |
| (4) | PS_B<br>PS_C | PS_A<br>PS_D | PS_A<br>PS_F |
| (5) | PL_OTN_1 | PL_OTN_2 | PL_OTN_3 |
| (6) | AS_1 | AS_2 | AS_2<br>AS_3 |

DEGREE OF OVERLAP 2 (between rows (3) and (4))

a (dashed box around PS_A and PS_A in row (4))

DEGREE OF OVERLAP 2 (between rows (5) and (6))

b (dashed box around AS_2 and AS_2 in row (6))

Fig. 15

| LAYER TYPE | Spec NAME | MEANING |
|---|---|---|
| FACILITY | PS Spec<br>(Physical Structure Specification) | DEFINE UNIQUE ATTRIBUTE FOR EACH PS |
| | AS Spec<br>(Aggregate Section Specification) | DEFINE UNIQUE ATTRIBUTE FOR EACH AS |
| PHYSICAL | PD Spec<br>(Physical Device Specification) | DEFINE UNIQUE ATTRIBUTE FOR EACH PD |
| | PP Spec<br>(Physical Port Specification) | DEFINE UNIQUE ATTRIBUTE FOR EACH PP |
| | PL Spec<br>(Physical Link Specification) | DEFINE UNIQUE ATTRIBUTE FOR EACH PL |
| | PC Spec<br>(Physical Connector Specification) | DEFINE UNIQUE ATTRIBUTE FOR EACH PC |

Fig. 16

| LAYER TYPE | Spec NAME | MEANING |
|---|---|---|
| LOGICAL | TL Spec<br>(Topological Link Specification) | DEFINE UNIQUE ATTRIBUTE FOR EACH TL |
| | NFD Spec<br>(Network Forwarding Domain Specification) | DEFINE UNIQUE ATTRIBUTE FOR EACH NFD |
| | TPE Spec<br>(Termination Point Encapsulation Specification) | DEFINE UNIQUE ATTRIBUTE FOR EACH TPE |
| | NC Spec<br>(Network Connection Specification) | DEFINE UNIQUE ATTRIBUTE FOR EACH NC |
| | LC Spec<br>(Link Connect Specification) | DEFINE UNIQUE ATTRIBUTE FOR EACH LC |
| | XC Spec<br>(Cross(X) Connect Specification) | DEFINE UNIQUE ATTRIBUTE FOR EACH XC |

Fig. 18

| Specification TABLE | |
|---|---|
| COLUMN NAME | TYPE |
| Entity | EXTERNAL KEY |
| SpecCharacteristic | EXTERNAL KEY |

Fig. 19

| Specification TABLE | |
|---|---|
| COLUMN NAME | TYPE |
| name | String |
| valueFrom | int |
| valueTo | int |
| type | String |

Fig. 20

| Entity TABLE | |
|---|---|
| COLUMN NAME | TYPE |
| ... | ... |
| ... | ... |

Fig. 21

| CharacteristicValue TABLE | |
|---|---|
| COLUMN NAME | TYPE |
| SpecCharacteristic (EXTERNAL KEY) | – |
| CharacteristicName | String |
| value | String |

Fig. 25

| TYPE OF FAILURE LOCATION Entity ARRAY | |
|---|---|
| FAILURE PASS Entity NAME | Object TYPE |
| PS Entity List (ARRAY) | PS Entity TYPE (ARRAY) |
| AS Entity List (ARRAY) | AS Entity TYPE (ARRAY) |
| PD Entity List (ARRAY) | PD Entity TYPE (ARRAY) |

Fig. 31

| TYPE OF OVERLAPPING Entity ARRAY | |
|---|---|
| OVERLAPPING Entity | Object TYPE |
| DEGREE OF OVERLAP | Int |

Fig. 32

| EXAMPLE OF FAILURE LOCATION Entity ARRAY | | | | |
|---|---|---|---|---|
| ARRAY index | FAILURE PASS Entity NAME | PS Entity List | AS Entity List | PD Entity List |
| 1 | FRE_LC(OTN)_2 | PS_A,<br>PS_D | AS_2 | PD_OTN_3,<br>PD_OTN_4 |
| 2 | FRE_LC(OTN)_3 | PS_A,<br>PS_F | AS_2 | PD_OTN_5,<br>PD_OTN_6 |

a b c

NETWORK MANAGEMENT APPARATUS, METHOD, AND PROGRAM

CROSS-REFERENCE TO RELATED APPLICATIONS

This application is a 371 U.S. National Phase of International Application No. PCT/JP2019/051316, filed on Dec. 26, 2019. The entire disclosure of the above application is incorporated herein by reference.

TECHNICAL FIELD

Embodiments of the present invention relate to a network management apparatus, method, and program.

BACKGROUND ART

There is a technique for identifying effects on a service by a same method regardless of the type of service and NW in artificially causing a failure in a building, communication cable, communication device, or communication medium on a physical layer that implements the service by a communication network, and simulating the effects of this failure on the service (see, for example, NPL 1).

CITATION LIST

Non Patent Literature

NPL 1: A Study on Method of Identifying Service Influence Occurred by Network Fault (A Study on Method of Visualization for Multiple Network Structure) (ICM Committee, March 2019)

SUMMARY OF THE INVENTION

Technical Problem

The technique disclosed in NPL 1 described above does not provide a means for identifying candidates for a location on a physical layer that has caused a failure occurring on a transmission layer, a service layer, or the like on a logical layer.

The present invention has been made in view of the above circumstances, and an object of the present invention is to provide a network management apparatus, method, and program capable of identifying candidates for a facility that has caused a failure occurring on a logical layer of a communication network.

Means for Solving the Problem

A network management apparatus according to an aspect of the present invention includes: a storage device configured to store information indicating a correspondence relationship between information objects related to a logical layer, information objects related to a physical layer in a network configuration, and information objects related to a facility layer which are objects in which the information objects related to the physical layer are housed; an acquisition unit configured to acquire an information object related to an occurrence path of a failure in the logical layer of the network configuration from the storage device; and a search unit configured to search for, among the information objects related to the facility layer stored in the storage device, an information object related to the facility layer and the physical layer associated with the information object related to the occurrence path of the failure acquired from the acquisition unit as a candidate for a facility that causes the failure.

A network management method according to an aspect of the present invention is a network management method performed by a network management apparatus including a storage device storing information indicating a correspondence relationship between information objects related to a logical layer, information objects related to a physical layer in a network configuration, and information objects related to a facility layer which are objects in which the information objects related to the physical layer are housed, the network management method including: acquiring an information object related to an occurrence path of a failure in the logical layer of the network configuration from the storage device; and searching for, among the information objects related to the facility layer stored in the storage device, an information object related to the facility layer and the physical layer associated with the information object acquired related to the occurrence path of the failure as a candidate for a facility that causes the failure.

Effects of the Invention

According to the present invention, it is possible to identify candidates for a facility that has caused a failure occurring on a logical layer of a communication network.

BRIEF DESCRIPTION OF DRAWINGS

FIG. 1 is a diagram illustrating, in a tabular form, an example of objectification of a facility layer in a network configuration applied to a network management apparatus according to an embodiment of the present invention.

FIG. 2 is a diagram illustrating, in a tabular form, an example of objectification of a physical layer in a network configuration applied to a network management apparatus according to an embodiment of the present invention.

FIG. 3 is a diagram illustrating, in a tabular form, an example of objectification of a Logical Device layer in a network configuration applied to a network management apparatus according to an embodiment of the present invention.

FIG. 4 is a diagram illustrating, in a tabular form, an example of objectification of a communication layer in a network configuration applied to a network management apparatus according to an embodiment of the present invention.

FIG. 10 is a diagram illustrating, in a tabular form, an example of search results of physical resources utilized by failure passes in a network configuration applied to a network management apparatus according to an embodiment of the present invention.

FIG. 12 is a diagram illustrating, in a tabular form, an example of search results of facility resources having common failure passes in a network configuration applied to a network management apparatus according to an embodiment of the present invention.

FIG. 15 is a diagram illustrating, in a tabular form, an example of Specs (facility layer and physical layer) of facility information held by a network management apparatus according to an embodiment of the present invention.

FIG. 16 is a diagram illustrating, in a tabular form, an example of Specs (logical layer) of facility information held by a network management apparatus according to an embodiment of the present invention.

FIG. 18 is a diagram illustrating, in a tabular form, an example of a schema of a Specification table of facility information specified by a network management apparatus according to an embodiment of the present invention.

FIG. 19 is a diagram illustrating, in a tabular form, an example of a schema of a SpecCharacteristic table of facility information specified by a network management apparatus according to an embodiment of the present invention.

FIG. 20 is a diagram illustrating, in a tabular form, an example of a schema of an Entity table of facility information specified by a network management apparatus according to an embodiment of the present invention.

FIG. 21 is a diagram illustrating, in a tabular form, an example of a schema of a CharacteristicValue table of facility information specified by a network management apparatus according to an embodiment of the present invention.

FIG. 25 is a diagram illustrating, in a tabular form, an example of types of arrays of failure location Entities applied by a network management apparatus according to an embodiment of the present invention.

FIG. 31 is a diagram illustrating, in a tabular form, an example of types of arrays of overlapping Entities applied by a network management apparatus according to an embodiment of the present invention.

FIG. 32 is a diagram illustrating, in a tabular form, an example of an array of failure location Entities applied by a network management apparatus according to an embodiment of the present invention.

DESCRIPTION OF EMBODIMENTS

Figure 5:
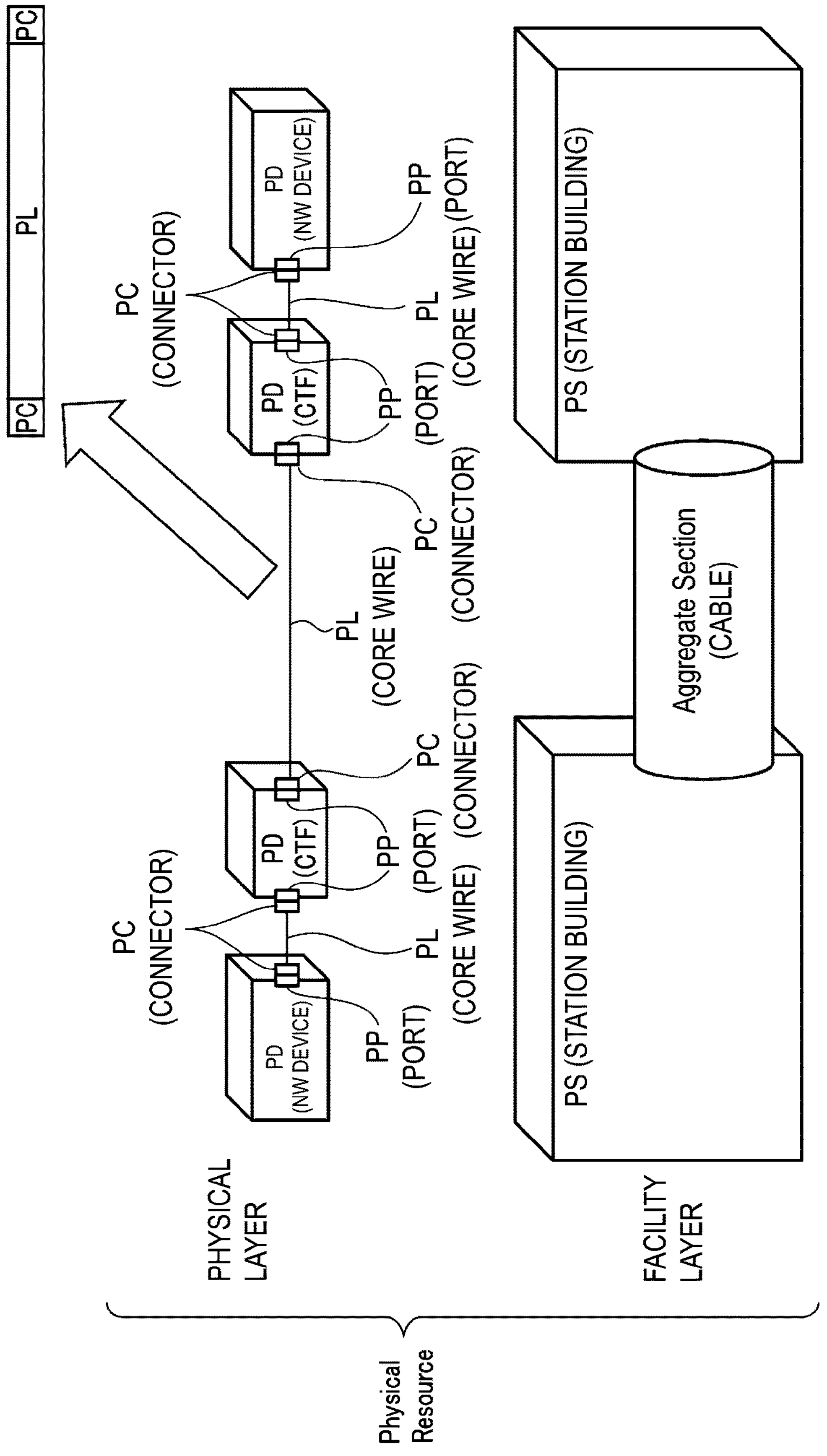
FIG. 5 is a diagram illustrating an application case of facility Entities and physical Entities applied to a network management apparatus according to an embodiment of the present invention.

Hereinafter, an embodiment according to the present invention will be described with reference to drawings.

In a network management apparatus according to an embodiment of the present invention, each component of a facility layer, a physical layer, and a logical layer of a communication network is objectified using a unified information object (hereinafter, simply referred to as an object).

The network management apparatus uses the connection between each two objects to identify, in the facility layer and the physical layer, candidates for a facility that has caused a failure in the logical layer. The objects of the physical layer are housed in the objects of the facility layer.

In this manner, candidates for a facility that has caused a failure in a network composed of a plurality of layers having different protocols and medium types are identified.

Next, an outline of a network management apparatus according to an embodiment of the present invention will be described in (1) to (11) below.

(1) The network management apparatus objectifies a target NW in the logical layer, the physical layer, and the facility layer in order from the higher layer by objects (Specs, Entities (information objects)) based on the related art.

The facility layer is, for example, a building, a cable, or the like. In the present embodiment, a building and a communication cable in the facility layer are held as a building object and a cable object, respectively. The abovementioned building is not particularly limited as long as it is a building or facility in which a communication device is housed. The above-mentioned cable is not particularly limited as long as it is a facility in which a communication medium is housed.

The physical layer is, for example, a network device, a communication port, or a communication medium. In the present embodiment, the network device, the communication port, and the communication medium in the physical layer are held as a device object, a port object, and a medium object, respectively.

The logical layer corresponds to, for example, a point object, or a line or surface object. In the present embodiment, a generating location or a termination of communication in a logical layer is held as a point object, and communication between point objects and a communicable range between the point objects are held as a line object and a surface object, respectively. Note that the physical layer and the facility layer described above may be referred to as a physical layer and a facility layer in a narrow sense included in the physical layer in a broad sense.

(2) The operator designates a plurality of line objects corresponding to the communication passes (sometimes referred to as failure passes) in which a failure has occurred, and sets a failure status.

(3) The network management apparatus acquires the point objects that constitute the line objects designated in (2).

(4) The network management apparatus repeatedly searches for the point objects of a lower layer that the point objects acquired in (3) have, and interrupts the processing in a case where a point object does not exist.

(5) The network management apparatus acquires the port objects that the point objects acquired by the time when the processing in (4) is interrupted have.

(6) The network management apparatus searches for device objects and medium objects belonging to the port objects acquired in (5).

(7) The network management apparatus acquires building objects including the device objects acquired in (6) (in which the device objects are housed).

(8) The network management apparatus acquires cable objects including the medium objects acquired in (6) (in which the medium objects are housed).

(9) The network management apparatus performs the procedures (3) to (8) for the plurality of line objects designated in (2), and acquires building objects, cable objects, device objects, and medium objects that are utilized by the line objects.

(10) Some of the building objects, cable objects, device objects, and medium objects that are commonly utilized by the line objects are utilized in an overlapping manner by other line objects. The network management apparatus holds and outputs the number of overlapping uses (degree of overlap) and corresponding objects of the facility and physical layers.

(11) The network management apparatus emphasizes and displays the objects of the facility and physical layers held in (10) in accordance with their respective degrees of overlap.

Next, the objectification of the network configuration will be described. Here, a method of objectification of the facility layer will be described. This objectification is also described in, for example, JP 2018-196853 specification and PCT/JP2019/040978.

FIG. 1 is a diagram illustrating, in a tabular form, an example of objectification of a facility layer in a network configuration applied to a network management apparatus according to an embodiment of the present invention.

As illustrated in FIG. 1, the configuration of the facility layer is held in a unified format by the application of Physical Structure (PS) and Aggregate Section (AS) Entities.

As illustrated in FIG. 1, Entity names in the facility layer are divided into PS and AS. As illustrated in FIG. 1, PS means a facility such as a building, a manhole, or the like. Various types of "attribute: description" related to PS are as follows.

(1st) status: attribute indicating the status of PS Entity (normal: true, failure: false)
(2nd) pdList: array of PD Entities that PS Entity has
(3rd) AsList: array of AS Entities that PS Entity has
(4th) Position: two-dimensional coordinates indicating position of PS Entity As illustrated in FIG. 1, Aggregate Section (AS) means a cable, a communication line, a cable tunnel/service tunnel, or the like. Various types of "attribute: description" related to AS are as follows.

(1st) status: attribute indicating the status of AS Entity (normal: true, failure: false)
(2nd) plList: array of PL Entities that AS Entity has
(3rd) position: two-dimensional coordinates indicating position of AS The PS of the facility layer corresponds to the building objects described above, and the AS of the facility layer corresponds to the cable objects described above.

Next, the objectification of the physical layer will be described.

FIG. 2 is a diagram illustrating, in a tabular form, an example of objectification of a physical layer in a network configuration applied to a network management apparatus according to an embodiment of the present invention.

As illustrated in FIG. 2, the configuration of the physical layer is held in a unified format by the application of Physical Device (PD), Physical Port (PP), Physical Link (PL), and Physical Connector (PC) Entities.

As illustrated in FIG. 2, Entity names in the physical layer are divided into PD, PP, PL, and PC.

As illustrated in FIG. 2, PD means a device. Various types of "attribute: description" related to PD are as follows.

(1st) status: attribute indicating the status of PD (normal operation: true, abnormal operation: false)
(2nd) ppList: array of PPs that PD has
(3rd) position: two-dimensional coordinates indicating position of PD PP means a communication port that the device has. Various types of "attribute: description" related to PP are as follows.

(1st) status: attribute indicating the status of PP (normal operation: true, abnormal operation: false)
(2nd) position: two-dimensional coordinates indicating position of PD PL means a core wire of a cable. Various types of "attribute: description" related to PL are as follows.

(1st) status: attribute indicating the status of PL (normal operation: true, abnormal operation: false)
(2nd) pcList: array of PCs that PL has PC means a connector for connection of a cable. Various types of "attribute: description" related to PC are as follows.

(1st) status: attribute indicating the status of PC (normal operation: true, abnormal operation: false)
(2nd) ppList: array of PPs that PC has The PDs in the physical layer correspond to the device objects described above, the PPs in the physical layer correspond to the port objects described above, and the PL and PC in the physical layer correspond to the medium objects described above.

Next, the objectification of the logical layer will be described.

FIGS. 3 and 4 are each a diagram illustrating, in a tabular form, an example of objectification of a logical layer in a network configuration applied to a network management apparatus according to an embodiment of the present invention.

As illustrated in FIGS. 3 and 4, the configuration of the logical layer is held in a unified format by the application of Termination Point Encapsulation (TPE), Network Fowarding Domain (NFD), Topological Link (TL), and Forwarding Relationship Encapsulation (FRE) (Link Connect (LC)), Cross (X) Connect (XC), and Network Connect (NC)) Entities.

As illustrated in FIG. 4, the FRE Entity is divided into Link Connect (LC), Cross (X) Connect (XC), and Network Connect (NC)) Entities.

TL means connectivity between devices (within the Logical Device layer). Various types of "attribute: description" related to TL are as follows.

(1st) EndPointList: TPE Entity array that constitutes TL Entity (2nd) status: attribute indicating the status of TL Entity (normal operation: true, abnormal operation: false)

NFD means the transferable range within the device (within the Logical Device layer). Various types of "attribute: description" related to NFD are as follows.

(1st) endPointList: TPE Entity array that constitutes NFD Entity (2nd) Status: attribute indicating the status of NFD Entity (normal operation: true, abnormal operation: false)

TPE means the termination point of the communication. Various types of "attribute: description" related to TPE are as follows.

(1st) tpeRefList: TPE Entity array having corresponding TPE Entities of a lower layer (the number of arrays is one in the example)

(2nd) ppRefList: PP Entity array corresponding to TPE Entity (the number of arrays is one in the example)

(3rd) status: attribute indicating the status of TPE Entity (normal operation: true, abnormal operation: false)

(4th) layerName: layer name

The TL in the logical layer corresponds to the line objects described above, the NFD in the logical layer corresponds to the line or surface objects described above, and the TPE in the logical layer corresponds to the point objects described above.

LC of FRE means connectivity between devices (within the communication layer). Various types of "attribute: description" related to LC are as follows.

(1st) endPointList: TPE Entity array that constitutes LC Entity (2nd) status: attribute indicating the status of LC Entity (normal operation: true, abnormal operation: false)

(3rd) layerName: layer name

XC means connectivity within the device (within the communication layer). Various types of "attribute: description" related to XC are as follows.

(1st) endPointList: TPE Entity array that constitutes XC Entity (2nd) status: attribute indicating the status of XC Entity (normal operation: true, abnormal operation: false)

(3rd) layerName: layer name

NC means the End-End connectivity formed by LC and XC (within the communication layer). Various types of "attribute: description" related to XC are as follows.

(1st) endPointList: TPE Entity array that constitutes LC and XC (2nd) status: attribute indicating the status of NC Entity (normal operation: true, abnormal operation: false)

(3rd) userList: character string array that holds the subscriber name or Uniform Resource Locator (URL) of an interface (IF) that acquires the subscriber name (4th) layerName: layer name The LC and the XC in the logical layer correspond to the line or surface objects described above. The NC in the logical layer corresponds to a communication object having a point object array in which all point objects between the starting point and the end point on the logical layer are stored.

Next, an application case of facility Entities and physical Entities will be described. FIG. 5 is a diagram illustrating an application case of facility Entities and physical Entities applied to a network management apparatus according to an embodiment of the present invention.

As illustrated in FIG. 5, a Physical Resource is divided into a physical layer and a facility layer.

In the example illustrated in FIG. 5, the physical layer of the Physical Resource has PDs (NW devices), PDs (Cable termination Frames (CTFs): optical fiber termination devices), PLs (core wires), PCs (connectors), and PPs (ports). The PDs (NW devices) and PDs (CTFs) each include the PP (port), and the PC (connector) is attached to each of both ends of the PL (core line).

The PP (port) on the PD (NW device) side is connected to the PC (connector) at one end of the PL (core wire) and the PP (port) on the PD (CTF) side is connected to the PC (connector) at the other end of the PL (core wire), thereby making it possible for the PD (NW device) and the PD (CTF) to communicate. The same applies to connections between the PDs (CTFs).

In an example illustrated in FIG. 5, the facility layer of the Physical Resource has PSs (station buildings), PDs (NW devices), PDs (CTFs), and an Aggregate Section (cable).

The Aggregate Section is an object having a plurality of PLs (core wires).

The PD (NW device) and the PD (CTF) are provided in each of the PSs (station buildings). In this manner, communication between the PSs (station buildings) becomes possible. For example, the PD (CTF) in a first PS (station building) and the PD (CTF) in a second PS (station building) become capable of PS (station building) communication via the Aggregate Section (cable).

Figure 6:
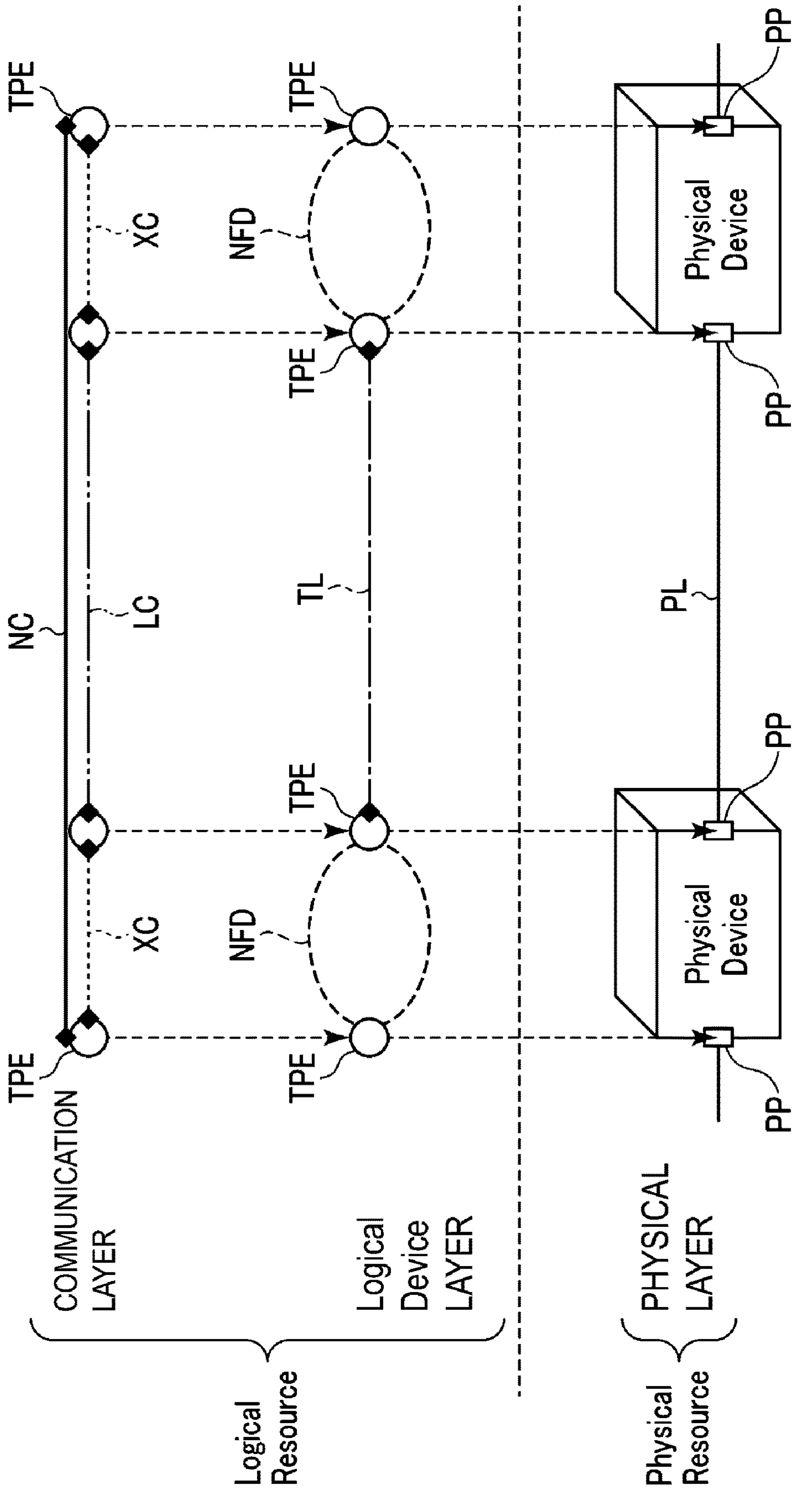
FIG. 6 is a diagram illustrating an application case of physical Entities and logical Entities applied to a network management apparatus according to an embodiment of the present invention.

Next, an application case of physical Entities and logical Entities will be described. FIG. 6 is a diagram illustrating an application case of physical Entities and logical Entities applied to a network management apparatus according to an embodiment of the present invention.

In the example illustrated in FIG. 6, the Physical Resource has a physical layer and the Logical Resource has a communication layer and a Logical Device layer. The Logical Device layer corresponds to objects in a lower layer relative to the logical layer, and the physical layer corresponds to an object in a lower layer relative to the Logical Device layer. In the example illustrated in FIG. 6, in the physical layer, the PPs of the Physical Devices are connected to a PC of one end of the PL and a PC of the other end of the PL.

The corresponding logical layer has TPEs, XCs, and an LC, and the Logical Device layer has TPEs, NFDs, and a TL.

In FIG. 6, an object in a lower layer relative to a point object in a layer is indicated by an arrow.

In the example illustrated in FIG. 6, the Physical Devices of the physical layer each correspond to the XC of the logical layer or the NFD of the Logical Device layer.

In the example illustrated in FIG. 6, the PPs of each of the Physical Devices correspond to the TPEs in the logical layer and the TPEs in the Logical Device layer. The same applies to the PCs attached to the PL.

In the example illustrated in FIG. 6, the PL in the physical layer corresponds to the LC in the logical layer and the TL in the Logical Device layer. In the example illustrated in FIG. 6, one NC is formed of the XCs and the LC in the logical layer.

Figure 7:
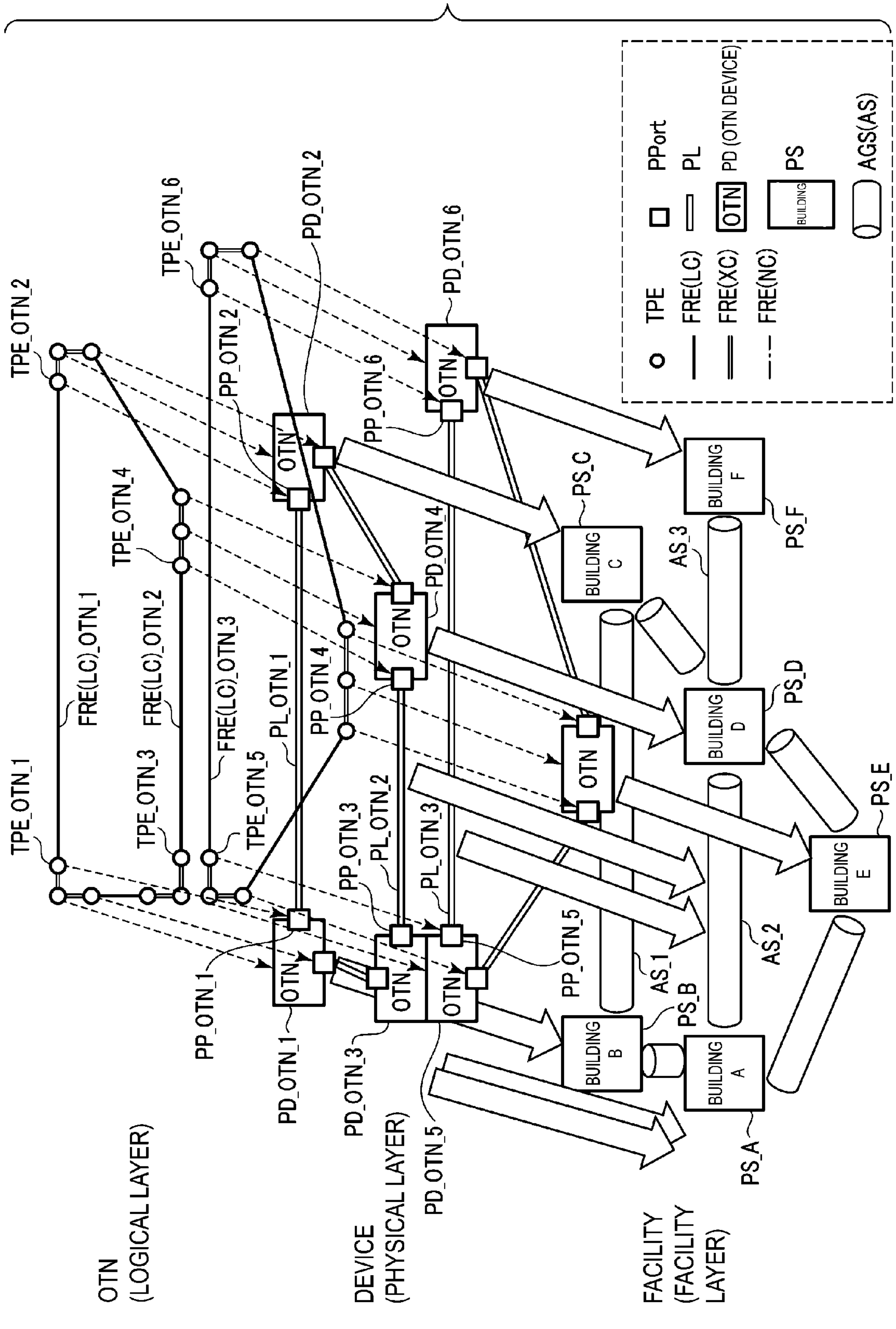
FIG. 7 is a diagram illustrating an example of objectification of a network configuration applied to a network management apparatus according to an embodiment of the present invention.

Next, a case of objectification of a network configuration will be described. FIG. 7 is a diagram illustrating an example of objectification of a network configuration applied to a network management apparatus according to an embodiment of the present invention.

Here, facility, physical, and logical layers of a network configuration of an Optical Transport Network (OTN) network that implements two optical rings (sometimes referred to as rings) are illustrated. Note that the Logical Device layer will be omitted.

In the example illustrated in FIG. 7, in the logical layer in which the OTN is implemented, TPEs and FREs (LC, XC, NC) including TPE_OTN_1 to 4 and FRE(LC)_OTN_1 and 2 are provided in the first ring.

In this logical layer, TPEs and a FRE (LC, XC, NC) including TPE_OTN_5 and 6 and FRE(LC)_OTN_3 are provided in the second ring.

In the physical layer in which the devices are implemented, PPs, PDs, and PLs including PP_OTN_1 to 4, PD_OTN_1 to 4, and PL_OTN_1 and 2 are provided in the first ring.

In this physical layer, PPs, PDs, and a PL including PP_OTN_5 and 6, PD_OTN5 and 6, and PL_OTN_3 are provided in the second ring.

In the facility layer in which the facilities are implemented, PSs and ASs including PS_A to F and AS_1 to 3 are provided.

TPE_OTN_1 to 6 of the logical layer correspond to PP_OTN_1 to 6 of the physical layer in a one-to-one manner.

FRE(LC)_OTN_1 to 3 of the logical layer correspond to PL_OTN_1 to 3 of the physical layer in a one-to-one manner. PL_OTN_1 to 3 above correspond to AS_1 to 3 of the facility layer in a one-to-one manner.

The physical layers PD_OTN_1 to 4 correspond to PS_B, C, A, and D of the facility layer in a one-to-one manner. The physical layer PD_OTN_5 and 6 correspond to PS_A and F of the facility layer in a one-to-one manner.

Figure 8:
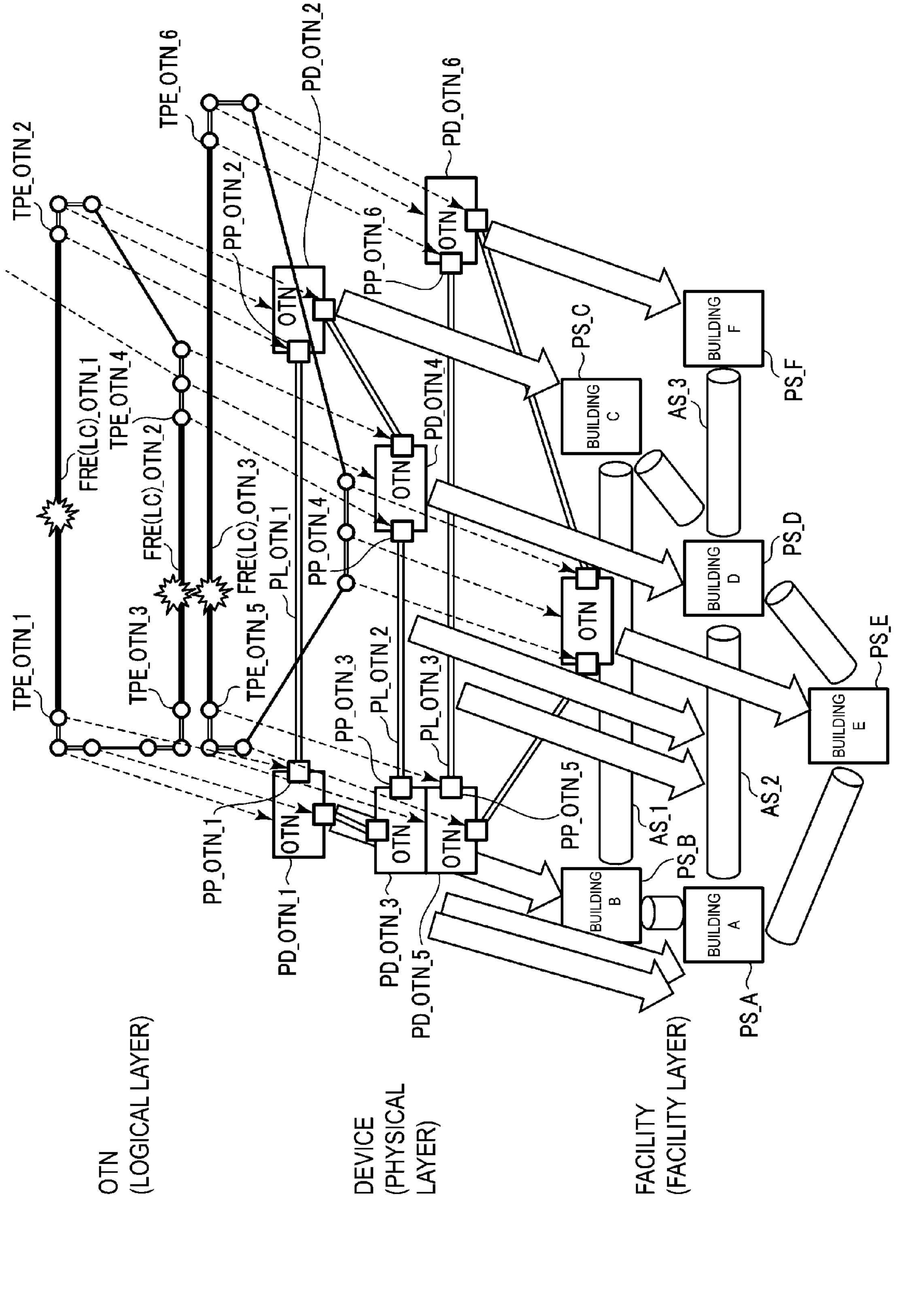
FIG. 8 is a diagram illustrating an example of designation of failure passes in a network configuration applied to a network management apparatus according to an embodiment of the present invention.

Next, an example of designation of failure passes related to a physical resource search will be described. FIG. 8 is a diagram illustrating an example of designation of failure passes in a network configuration applied to a network management apparatus according to an embodiment of the present invention.

Here, as illustrated in FIG. 8, it is assumed that a failure has occurred on FRE(LC)_OTN_1, 2, and 3 on the OTN (logical layer). In the present embodiment, these are designated as three failure passes, and buildings, cables, and device cables, which are physical resources utilized by these passes, are searched for.

Note that the media housed by the cable AS_2 and 3 are PL_OTN_2 and 3.

Figure 9:
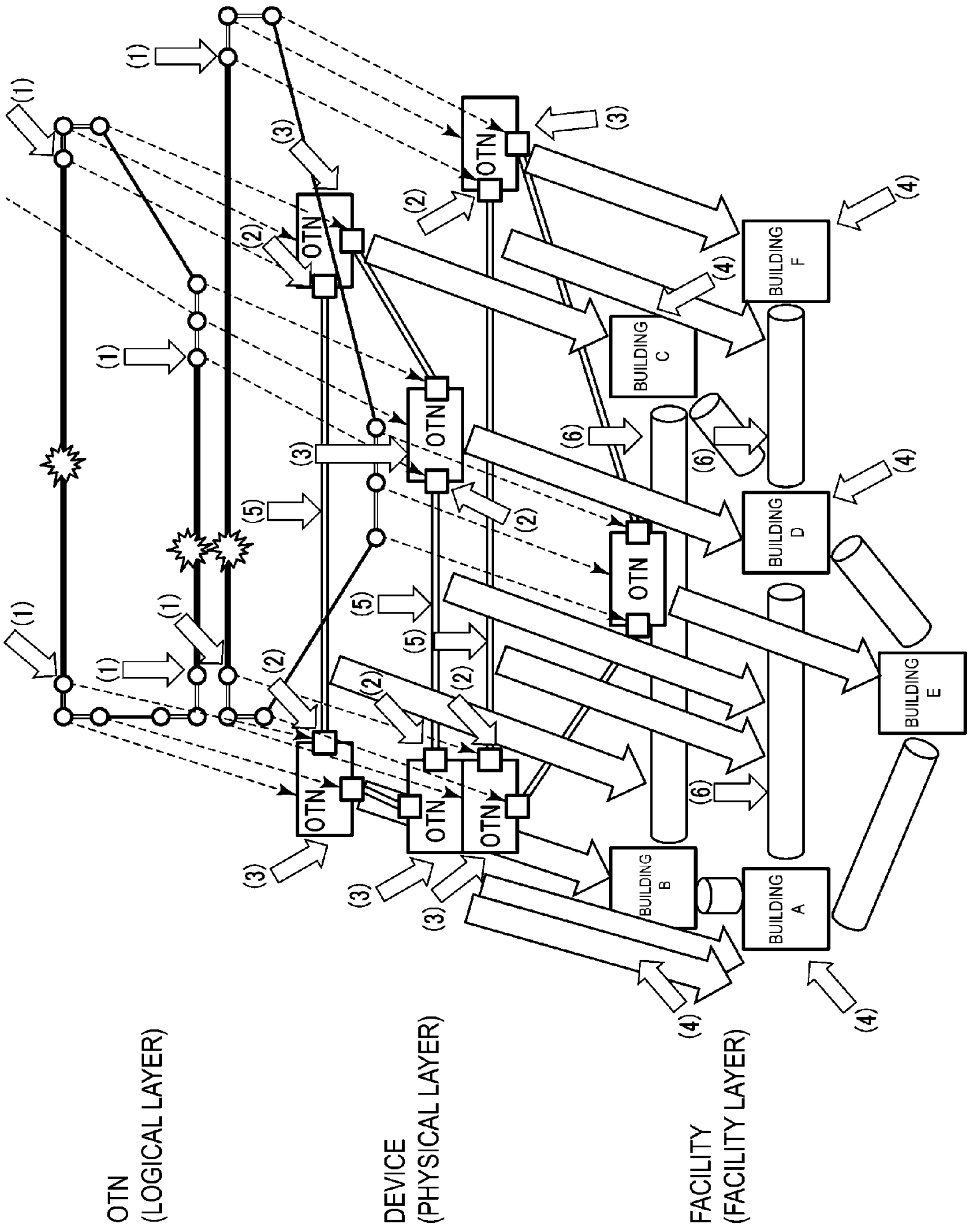
FIG. 9 is a diagram illustrating an example of a search for physical Resources utilized by failure passes in a network configuration applied to a network management apparatus according to an embodiment of the present invention.

FIG. 9 is a diagram illustrating an example of a search for physical resources utilized by failure passes in a network configuration applied to a network management apparatus according to an embodiment of the present invention.

The physical resources utilized by the failure passes are searched for by (1) to (6) below.

(1) The physical resource search unit 15 searches for TPEs that constitute two failure passes (FRE (LC)).

(2) The physical resource search unit 15 searches for the PPorts (PPs) corresponding to the TPEs obtained in (1).

(3) The physical resource search unit 15 searches for PDs to which the PPorts obtained in (2) belong.

(4) The physical resource search unit 15 searches for PSs to which the PDs obtained in (3) belong.

(5) The physical resource search unit 15 searches for PLs at which the PPorts obtained in (2) terminate.

(6) The physical resource search unit 15 searches for ASs to which the PLs obtained in (5) belong.

FIG. 10 is a diagram illustrating, in a tabular form, an example of search results of physical resources utilized by failure passes in a network configuration applied to a network management apparatus according to an embodiment of the present invention.

The search results related to the physical resources utilized by the failure passes FRE(LC)_OTN_1, 2, and 3 illustrated in FIG. 9 by (1) to (6) above are as follows.

Search Results Related to FRE(LC)_OTN_1
Search Results by (1): TPE_OTN_1 and 2
Search Results by (2): PP_OTN_1 and 2
Search Results by (3): PD_OTN_1 and 2
Search Results by (4): PS_B and C
Search Results by (5): PL_OTN_1
Search Results by (6): AS_1
Search Results Related to FRE(LC)_OTN_2
Search Results by (1): TPE_OTN_3 and 4
Search Results by (2): PP_OTN_3 and 4
Search Results by (3): PD_OTN_3 and 4
Search Results by (4): PS_A and D
Search Results by (5): PL_OTN_2
Search Results by (6): AS_2
Search Results Related to FRE(LC)_OTN_3
Search Results by (1): TPE_OTN_5 and 6
Search Results by (2): PP_OTN_5 and 6
Search Results by (3): PD_OTN_5 and 6
Search Results by (4): PS_A and F
Search Results by (5): PL_OTN_3
Search Results by (6): AS_2 and 3

Next, a search for physical resources that are commonly utilized (in an overlapping manner) by a plurality of failure passes will be described.

Figure 11:
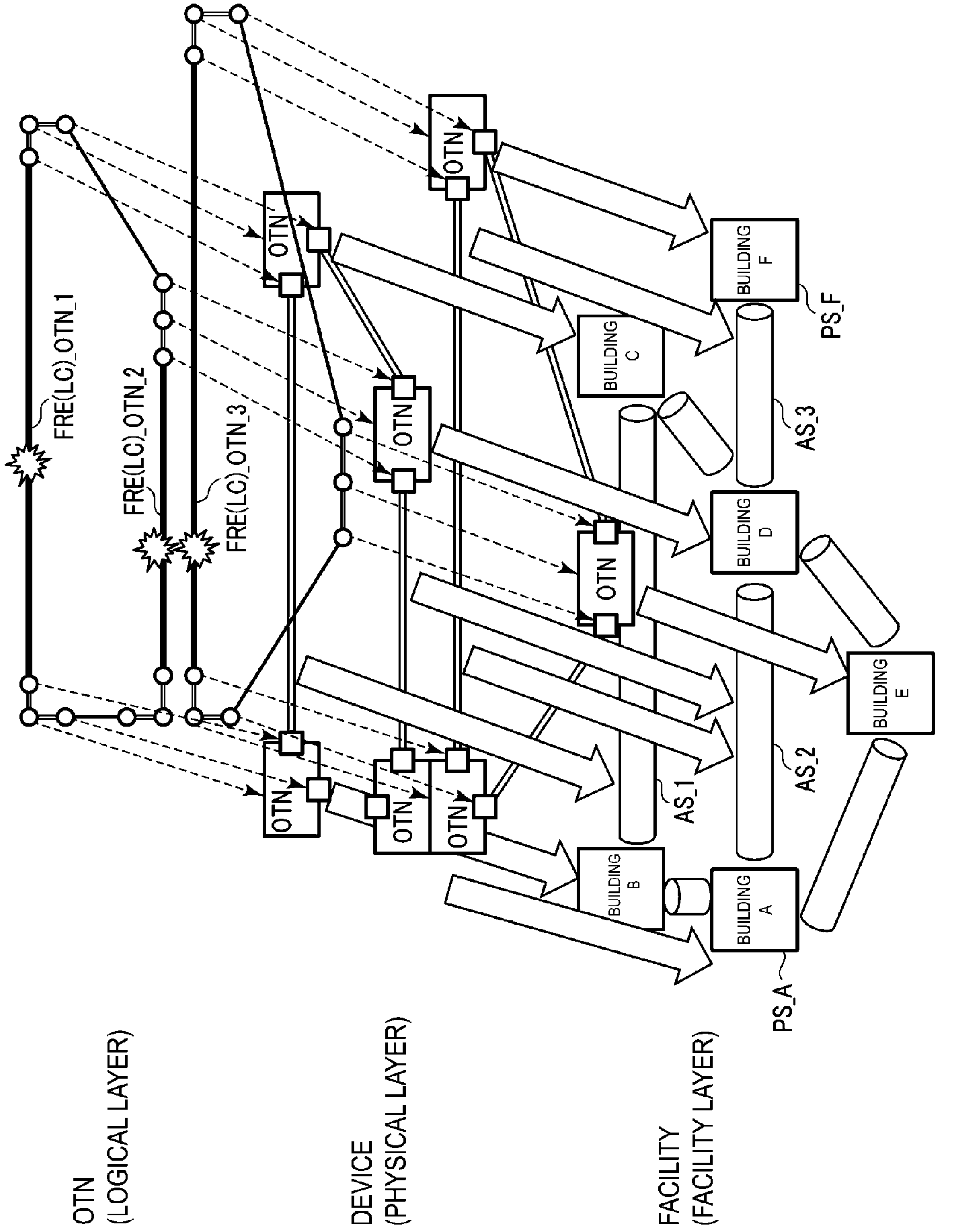
FIG. 11 is a diagram illustrating an example of a search for physical resources having common failure passes in a network configuration applied to a network management apparatus according to an embodiment of the present invention.

FIG. 11 is a diagram illustrating an example of a search for physical resources having common failure passes in a network configuration applied to a network management apparatus according to an embodiment of the present invention. FIG. 12 is a diagram illustrating, in a tabular form, an example of search results of facility resources having common failure passes in a network configuration applied to a network management apparatus according to an embodiment of the present invention.

Here, of the physical and facility resources utilized by the failure passes, PSs, ASs, and PDs which are utilized in an overlapping manner by a plurality of failure passes are searched for.

In the example illustrated in FIGS. 11 and 12, PS_A and AS_2 are utilized by two failure passes FRE(LC)_OTN_1 and 2. Here, the degree of overlap (degree of overlap 2)

corresponding to the number of failure passes that are the main constituents to be utilized is illustrated.

Next, a configuration of a network management apparatus will be described.

Figure 13:
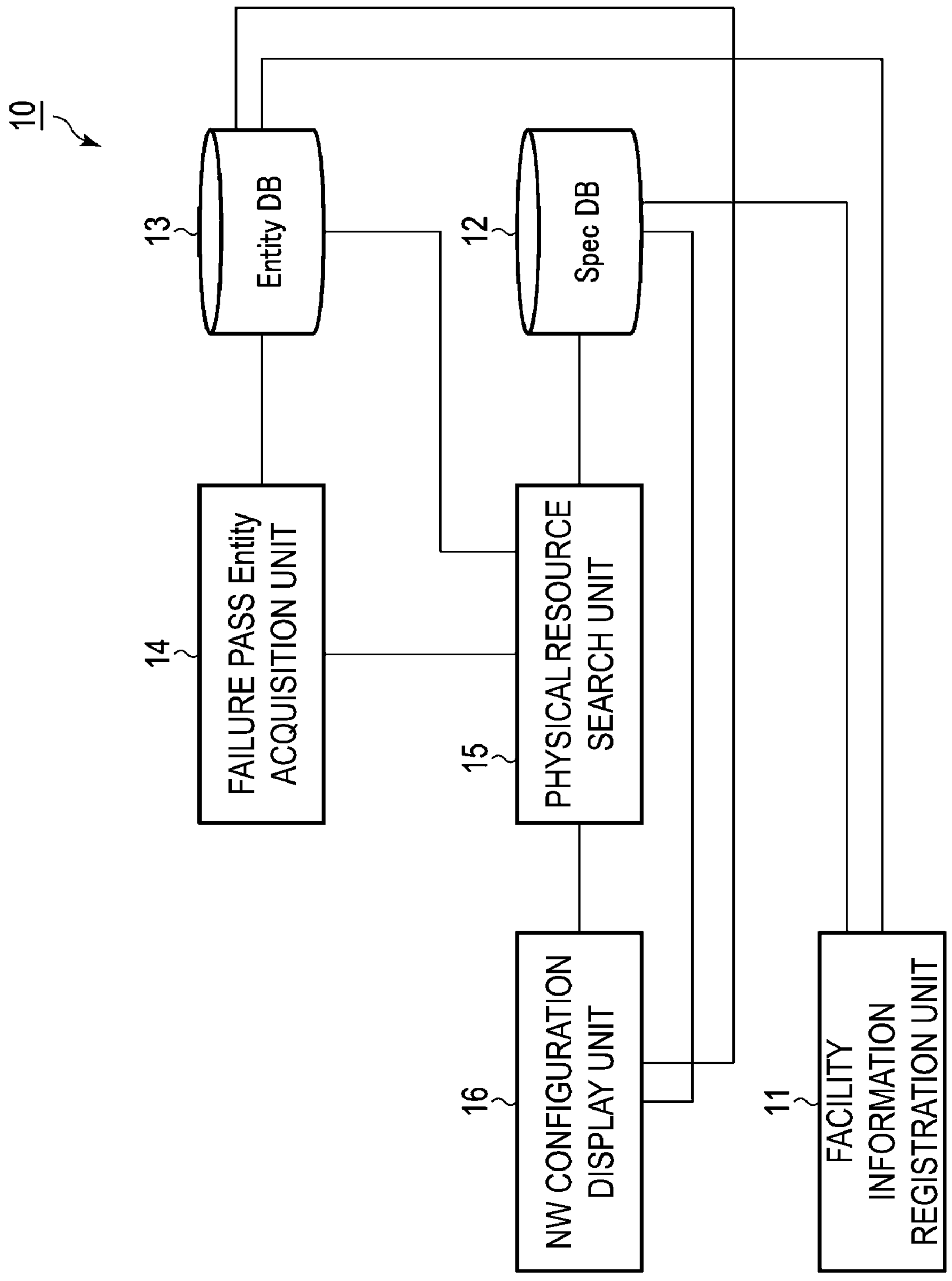
FIG. 13 is a diagram illustrating an example of a software configuration of a network management apparatus according to an embodiment of the present invention.

FIG. 13 is a diagram illustrating a functional configuration example of a network management apparatus according to an embodiment of the present invention.

In the example illustrated in FIG. 13, the network management apparatus 10 may be configured as a computer that includes a Central Processing Unit (CPU), a program memory, a computation memory, and the like, and includes, as illustrated in FIG. 13, a facility information registration unit 11, a Spec DB (database) 12, an Entity DB 13, a failure pass Entity acquisition unit 14, a physical resource search unit 15, and an NW configuration display unit 16, as the functions necessary to implement this embodiment. Processing thereof will be described below.

The facility information registration unit 11, the failure pass Entity acquisition unit 14, the physical resource search unit 15, and the NW configuration display unit 16 may be implemented by causing the CPU to execute a program stored in the program memory. The Spec DB 12 and the Entity DB 13 may be implemented by a storage device such as a non-volatile memory. The NW configuration display unit 16 may be implemented by using a display device such as a liquid crystal display.

Note that the network management apparatus 10 can be configured using hardware, but can be implemented by, for example, installing a program including a procedure illustrated in a flowchart to be described below to a known computer via a medium or a communication line, and combining the program-installed computer, the Spec DB 12 and the DB 13, or causing the program-installed computer to have the Spec DB 12 and the Entity DB 13. The hardware configuration of the network management apparatus 10 will be described in detail below.

Figure 14:
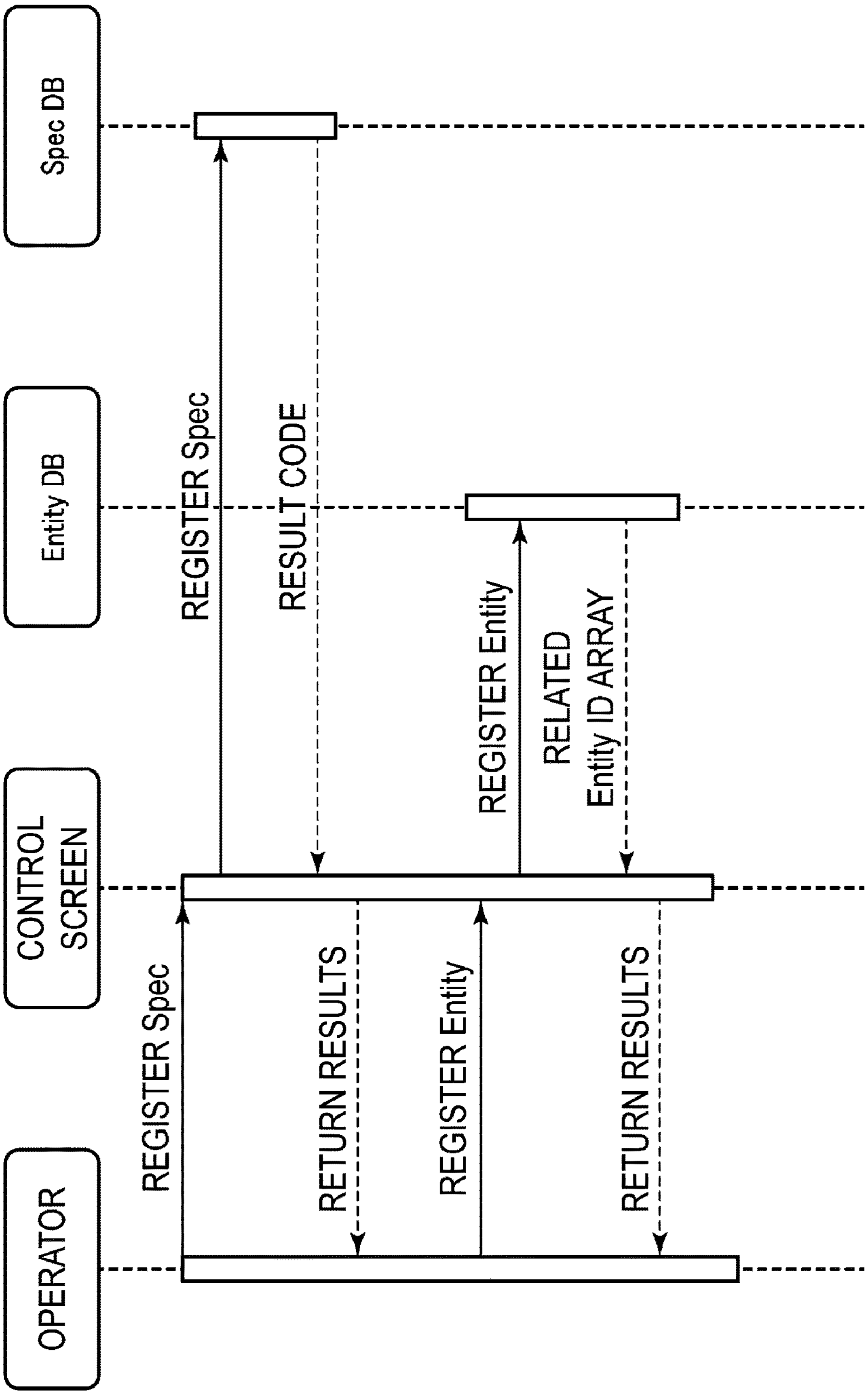
FIG. 14 is a sequence diagram illustrating an example of a procedure for registration of facility information by a network management apparatus according to an embodiment of the present invention.

Next, the details of the network management apparatus 10 will be described. First, registration of facility information (Spec (Specification), Entity) will be described. FIG. 14 is a sequence diagram illustrating an example of a procedure for registration of facility information by a network management apparatus according to an embodiment of the present invention.

First, when an operator performs an operation related to registration of facility information (Spec) along a control screen, the facility information (Spec) is registered in the Spec DB 12, a registration result code is returned to the control screen, and the registration result is returned to a display screen on the operator side.

Next, Specs (physical layer) of the facility information will be described. FIG. 15 is a diagram illustrating, in a tabular form, an example of Specs (facility layer and physical layer) of facility information held by a network management apparatus according to an embodiment of the present invention.

In the physical layer, attributes that are unique information such as a device name or a cable type are held in the Spec DB 12 as information in which Spec (Specification) classes (defining attributes indicating characteristics) are instantiated. Specifically, the following Spec classes are defined.

These Specs are mainly utilized in the display of the NW configuration.

The "Spec name: meaning" in the facility layer is as follows.

PS Spec (Physical Structure Specification): defining a unique attribute for each PS AS Spec (Aggregate Section Specification): defining a unique attribute for each AS The "Spec name: meaning" in the physical layer is as follows.

PD Spec (Physical Device Specification): defining a unique attribute for each PD PP Spec (Physical Port Specification): defining a unique attribute for each PP PL Spec (Physical Link Specification): defining a unique attribute for each PL PC Spec (Physical Connector Specification): defining a unique attribute for each PC Next, Specs (logical layer) of the facility information will be described. FIG. 16 is a diagram illustrating, in a tabular form, an example of Specs (logical layer) of facility information held by a network management apparatus according to an embodiment of the present invention. In the logical layer, unique attributes for layers (Virtual LAN IDentifier (VLAN ID), Internet Protocol (IP) address, wavelength number, etc.) are held in the Spec DB 12 as information in which each Spec class is instantiated. Specifically, the following Spec classes are defined.

The "Spec name: meaning" in the logical layer is as follows.

Figure 17:
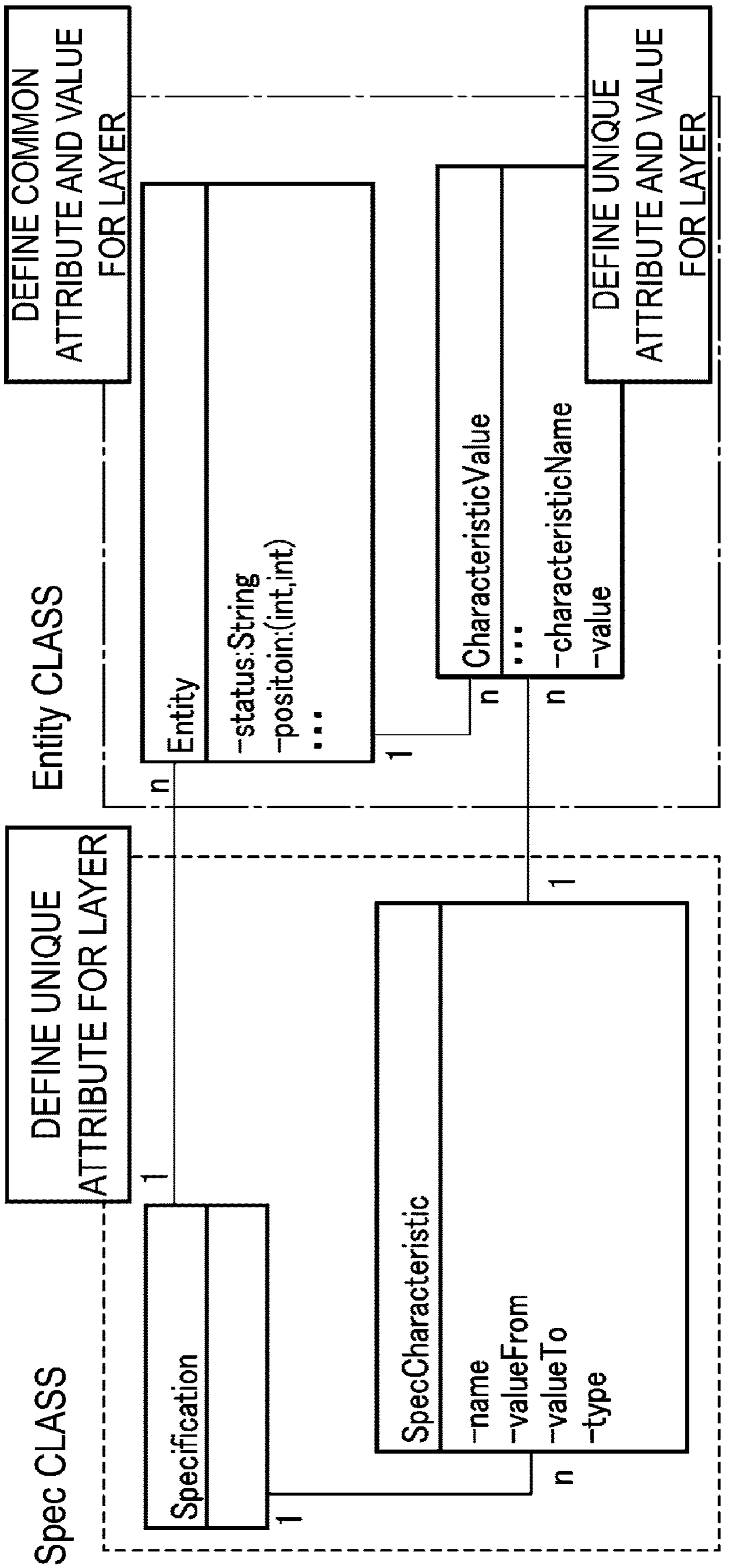
FIG. 17 is a diagram illustrating an example of use of a Spec class and an Entity class by a network management apparatus according to an embodiment of the present invention.

TL Spec (Topological Link Specification): defining a unique attribute for each TL NFD Spec (Network Forwarding Domain Specification): defining a unique attribute for each NFD TPE Spec (Termination Point Encapsulation Specification): defining a unique attribute for each TPE NC Spec (Network Connection Specification): defining a unique attribute for each NC LC Spec (Link Connect Specification): defining a unique attribute for each LC XC Spec (Cross (X) Connect Specification): defining a unique attribute for each XC Next, a method of utilizing a Spec class and an Entity class (class in which attribute values are defined) will be described. FIG. 17 is a diagram illustrating an example of use of a Spec class and an Entity class by a network management apparatus according to an embodiment of the present invention.

As illustrated in FIG. 17, attributes common to a layer and values thereof are held in the Entity DB 13 as the information in which the Entity class is instantiated.

One Specification class in the Spec class is associated with n SpecCharacteristic classes and n Entity classes. The SpecCharacteristic classes each include a name, a valueFrom, a valueTo, and a Type described below.

The Entity class includes "status: String" and "position (int, int)". One Entity class is associated with n CharacteristicValue classes (external class of the Entity class, where a specific characteristic is stored, the specific characteristic being obtained by embodying any one of characteristics specified in the SpecCharacteristic classes).

The CharacteristicValue class includes a CharacteristicName and a Value described below.

The layer-specific attribute name is held in the Spec DB 12 as information in which the SpecCharacteristic class (external class of Specification class) is instantiated.

The layer-specific attribute value is held in the Spec DB 12 as information in which the CharacteristicValue class is instantiated. Note that the attribute name is defined by the SpecCharacteristic class.

Next, the schema of the Spec DB and the Entity DB will be described. FIG. 18 is a diagram illustrating, in a tabular form, an example of a schema of a Specificication table of facility information specified by a network management apparatus according to an embodiment of the present invention.

The schema of the Specificication table held in the Spec DB 12 (column name: type) is as follows (see Specificication in FIG. 17).

Entity: external key

SpecCharacteristic: external key

FIG. 19 is a diagram illustrating, in a tabular form, an example of a schema of a SpecCharacteristic table of facility information specified by a network management apparatus according to an embodiment of the present invention.

The schema of the SpecCharacteristic table held in the Spec DB 12 (column name: type) is as follows (see SpecCharacteristic in FIG. 17).

Name: String

ValueFrom: int

ValueTo: int

Type: String

Figure 20:
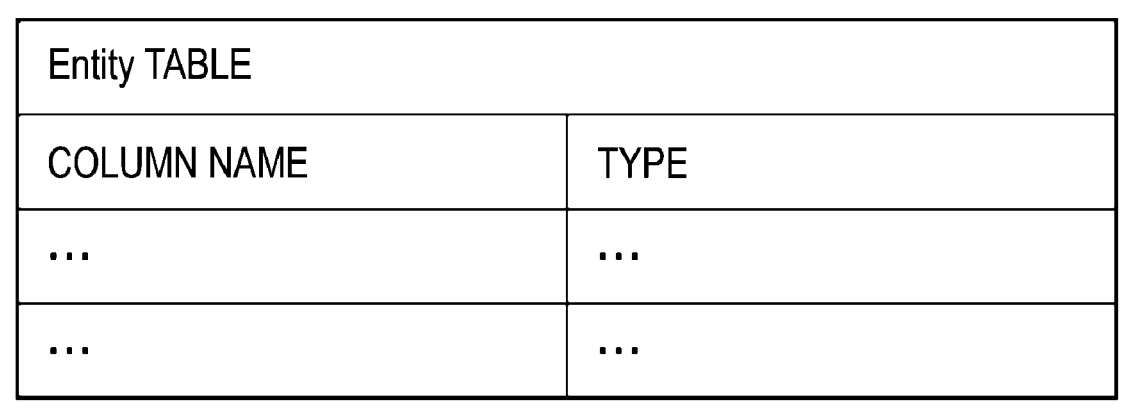

FIG. 20 is a diagram illustrating, in a tabular form, an example of a schema of an Entity table of facility information specified by a network management apparatus according to an embodiment of the present invention.

The schema of the Entity table held in the Entity DB 13 (column name: type) follows the definition of Entity.

FIG. 21 is a diagram illustrating, in a tabular form, an example of a schema of a CharacteristicValue table of facility information specified by a network management apparatus according to an embodiment of the present invention.

The schema of the CharacteristicValue table held in the Entity DB 13 (column name: type) is as follows (see CharacteristicValue in FIG. 17).

SpecCharacteristic (external key): —

CharacteristicName: String value: String

Next, a method of registering the Specs will be described.

(1) The Specs of the facility information illustrated in FIGS. 15 and 16 are created as a table in the Spec DB 12 as the forms of Specification and SpecCharacteristic illustrated in FIG. 17. For example, in the PS Spec illustrated in FIG. 35, the SpecCharacteristic table illustrated in FIG. 17 is managed as a plurality of tables by an external key. This SpecCharacteristic table includes four attributes (see FIG. 17) of a name (name of characteristic), a valueFrom (upper limit of specific value allowed by characteristic), a valueTo (lower limit of specific values allowed by characteristic), and a type (type of specific value of characteristic).

(2) An attribute required for a unique value in the logical layer to be stored in the Spec DB 12 is set to the name attribute of SpecCharacteristic (see FIG. 17).

(3) The type in which this name attribute is set is set to the type attribute of SpecCharacteristic (see FIG. 17).

(4) In a case where an assumption for setting a value in the attribute required for a unique value in the logical layer to be stored in the Spec DB 12 is required, this assumption is set to valueFrom and valueTo attributes of SpecCharacteristic (see FIG. 17).

Next, a method of registering Entities will be described.

(1) The attributes of the Entities described in FIGS. 1 to 4 are created in the Entity DB 13 as a table. For example, for the PD, PP, and PS Entities (see FIGS. 1 and 2), a table is created by a schema of two attributes including a status and a coordinate.

(2) A value common to the logical layer is stored in a record of the corresponding table in the Entity DB 13.

(3) In the attribute required to store a unique value in the logical layer, the attribute name set in the name attribute of SpecCharacteristic of the corresponding Spec is set to the CharacteristicName attribute of the CharacteristicValue, and a value thereof is set to the value attribute of the CharacteristicValue (see FIG. 17).

Next, input of a failure location and the like will be described.

Figure 22:
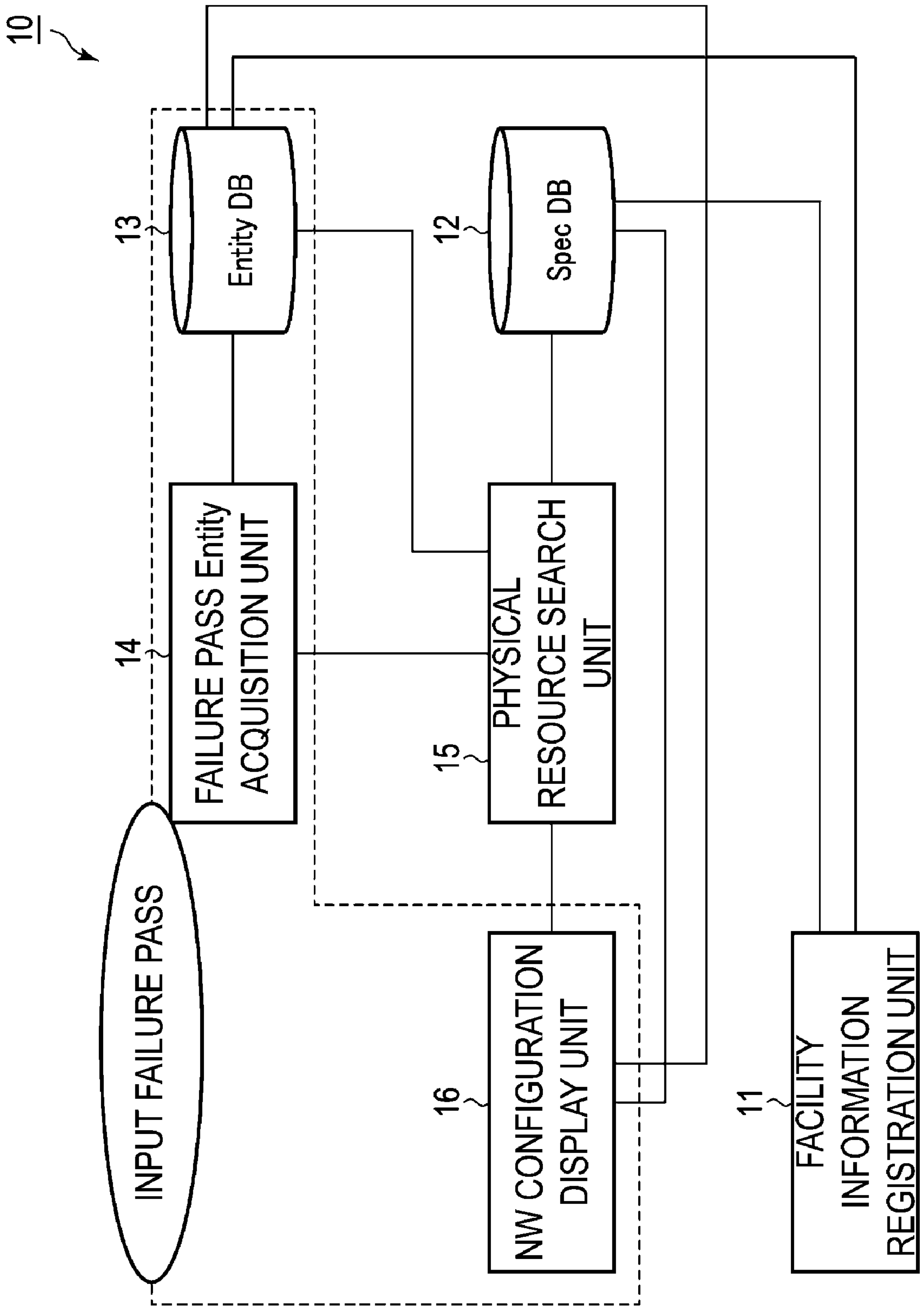
FIG. 22 is a diagram illustrating an example of components that function in input of a failure location in a network management apparatus according to an embodiment of the present invention.

First, a correspondence relationship between input of a failure location (use case) and function units will be described. FIG. 22 is a diagram illustrating an example of components that function in input of a failure location in a network management apparatus according to an embodiment of the present invention.

As illustrated in FIG. 22, in the input of a failure location, the facility information registration unit 11 and the Entity DB 13 function.

Next, processing by the failure pass Entity acquisition unit 14 will be described.

(1) The failure pass Entity acquisition unit 14 can designate a plurality of failure passes via a Graphical User Interface (GUI), in response to an operation on an input device such as a keyboard or mouse from a drawing object displayed by the NW configuration display unit 16 on the display screen of the network configuration by the operator, for example.

(2) The failure pass Entity acquisition unit 14 acquires the Entity ID unique to each Entity from the Entity DB 13 for one of the drawing objects of the plurality of designated failure passes.

(3) The failure pass Entity acquisition unit 14 accesses the Entity DB 13 by the acquired Entity ID, and acquires the Entity corresponding to the failure pass (hereinafter, may be referred to as a failure pass Entity).

Next, a search for physical resources utilized by failure passes will be described.

Figure 23:
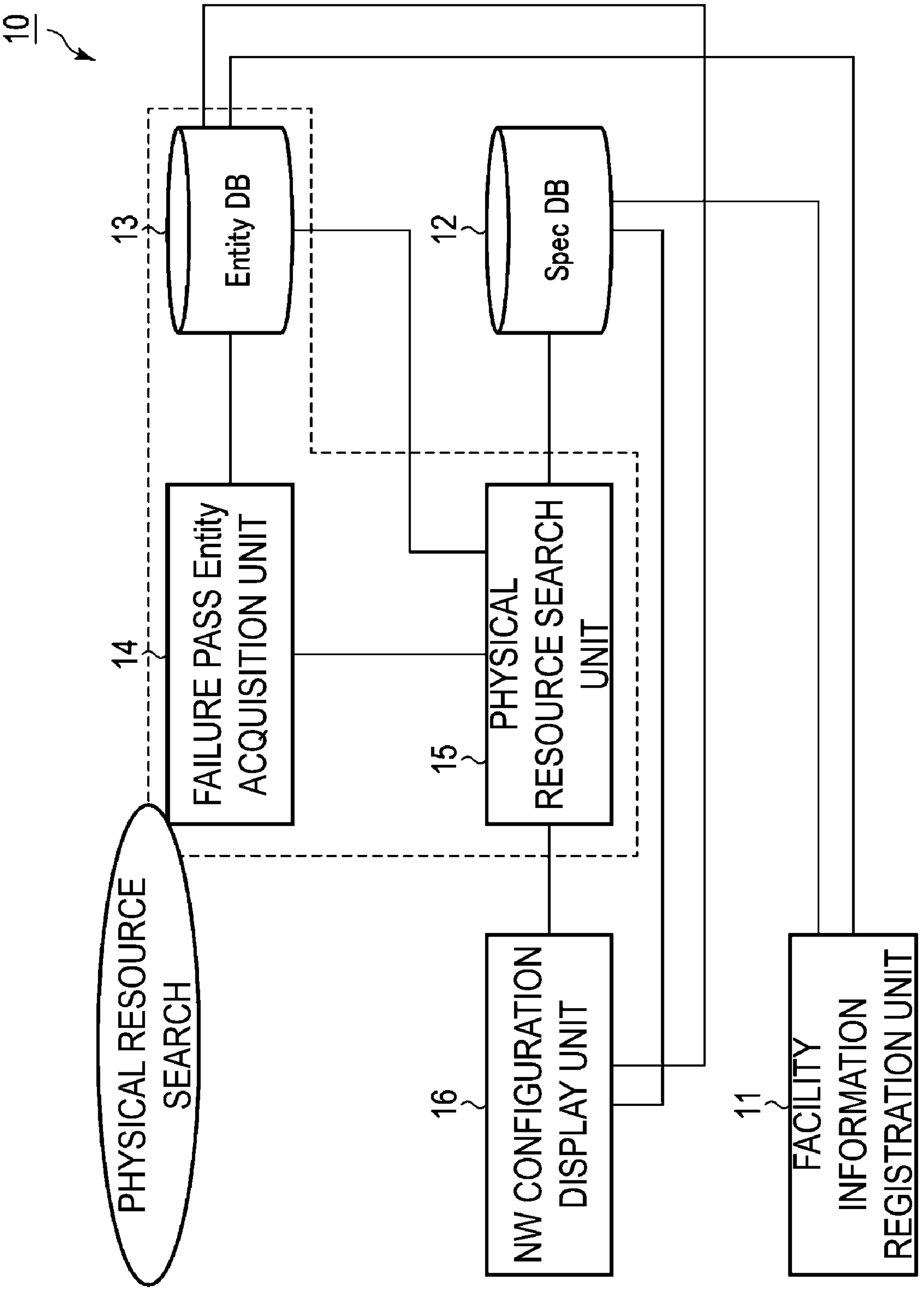
FIG. 23 is a diagram illustrating an example of components that function in search for physical resources in a network management apparatus according to an embodiment of the present invention.

FIG. 23 is a diagram illustrating an example of components that function in a physical resource search in a network management apparatus according to an embodiment of the present invention. As illustrated in FIG. 23, in the physical resource search, the Entity DB 13, the failure pass Entity acquisition unit 14, and the physical resource search unit 15 function.

Next, the process from the input of the failure pass to the search for the physical resources utilized by the failure pass will be described.

Figure 24:
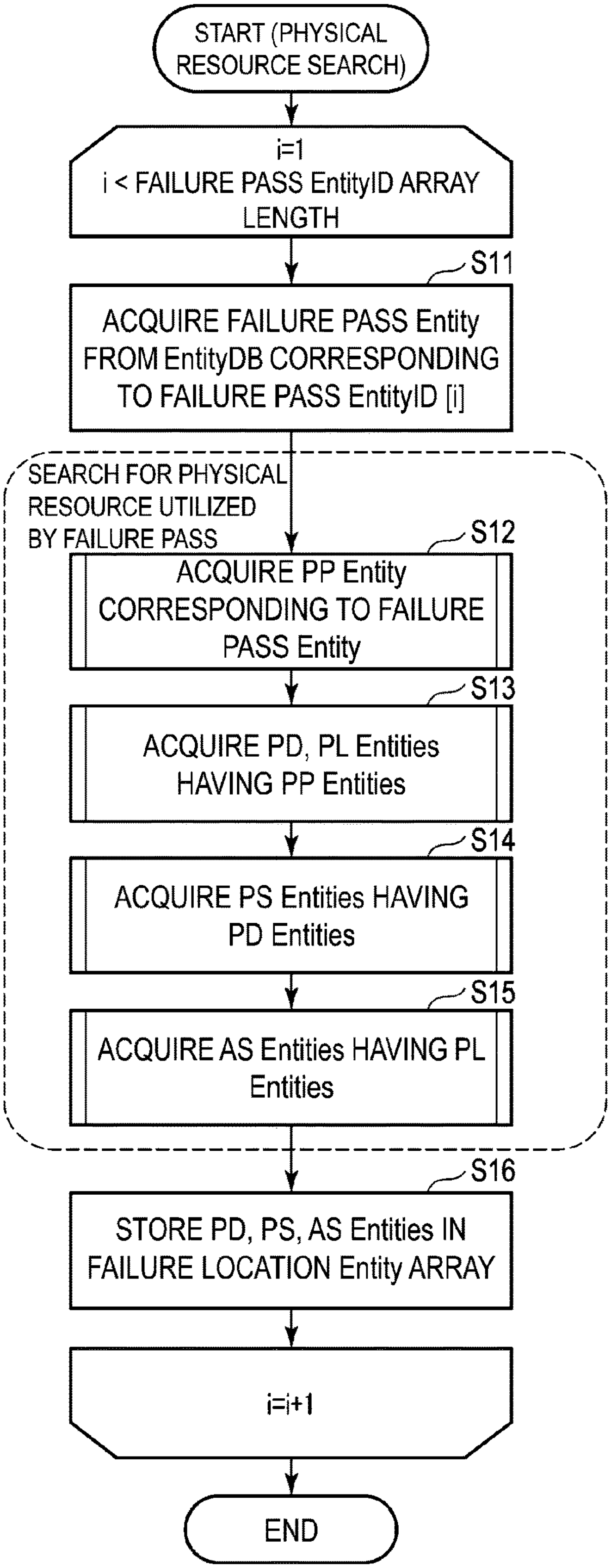
FIG. 24 is a flowchart illustrating an example of a processing procedure from an input of a failure pass to a search for physical and facility resources by a network management apparatus according to an embodiment of the present invention.

FIG. 24 is a flowchart illustrating an example of a processing procedure from an input of a failure pass to a search for physical and facility resources by a network management apparatus according to an embodiment of the present invention.

The physical resource search unit 15 sets the index "i=1" and performs the processing S11 to S16 below until the condition "i<failure pass Entity ID array length" is satisfied.

The physical resource search unit 15 acquires the failure pass Entities from the Entity DB 13 corresponding to the failure pass Entity ID [i] (S11). S11 corresponds to an input of a failure pass.

The physical resource search unit 15 acquires PP Entities corresponding to the failure pass Entities acquired at S11 from the Entity DB 13 (S12).

The physical resource search unit 15 acquires PD and PL Entities having the PP Entities acquired at S12 from the Entity DB 13 (S13).

The physical resource search unit 15 acquires PS Entities having the PD Entities acquired at S13 from the Entity DB 13 (S14).

The physical resource search unit 15 acquires AS Entities having the PL Entities acquired at S13 from the Entity DB 13 (S15). The processing from S12 to S15 corresponds to the physical resource search utilized by the failure pass. Details of the processing of S12 to S15 will be described later.

The physical resource search unit 15 stores PD, PS, and AS Entities acquired at S13 to S15 in the failure location Entity array (S16).

After S16, when the above condition related to the index is not satisfied, the physical resource search unit 15 sets the index "i=i+1" and returns to S11. The process ends when the condition is satisfied.

Next, types of failure location Entity arrays will be described. FIG. 25 is a diagram illustrating, in a tabular form, an example of types of arrays of failure location Entities applied by a network management apparatus according to an embodiment of the present invention.

The types of failure pass Entity name, PS EntityList (array), AS EntityList (array), and PD EntityList (array) of an array of failure location Entities are as follows.

(1) Failure pass Entity name: Object type (2) PS EntityList (array): PS Entity type (array)

(3) AS EntityList (array): AS Entity type (array)

(4) PD EntityList (array): PD Entity type (array)

Figure 26:
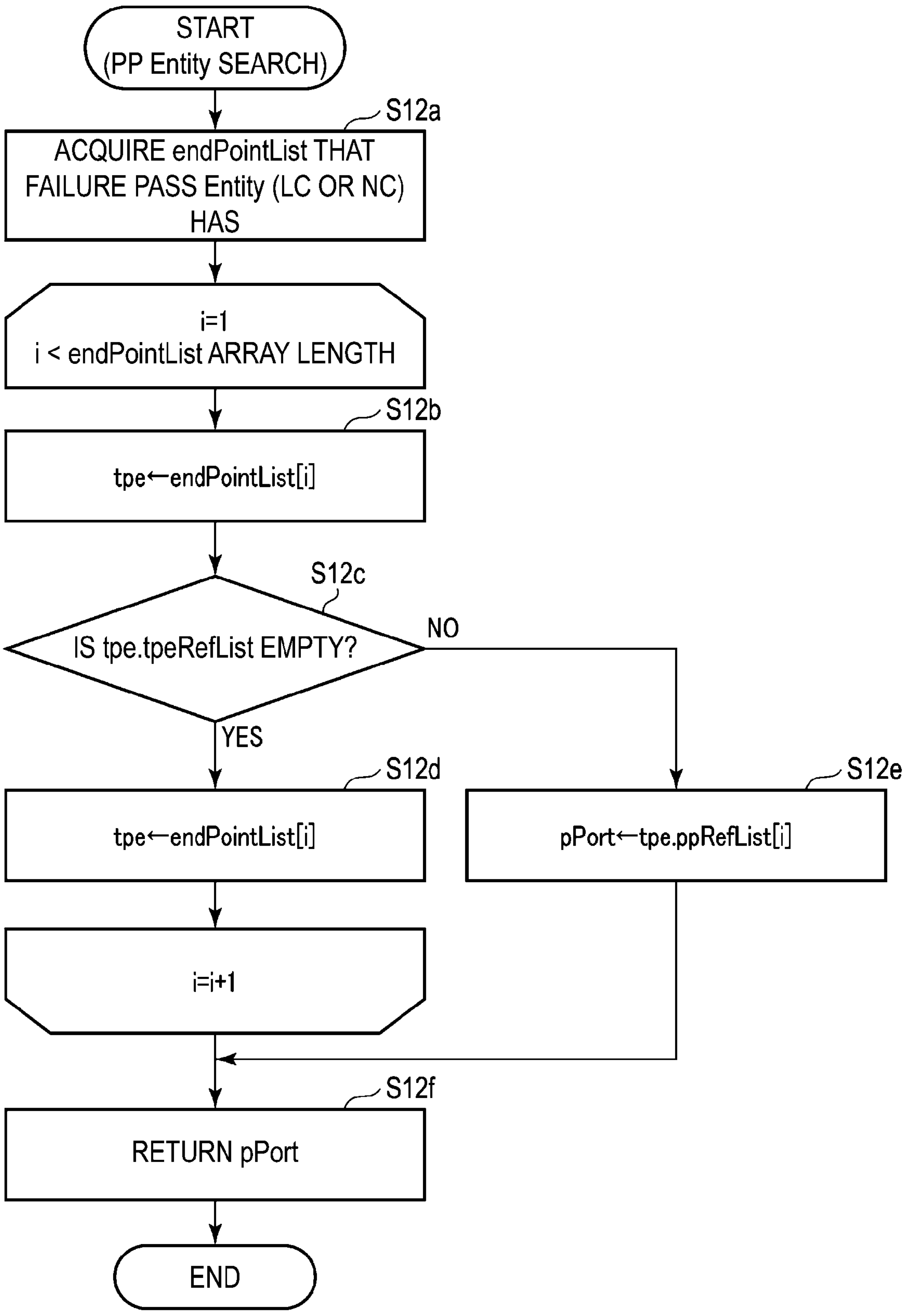
FIG. 26 is a flowchart illustrating an example of a processing procedure for a search for PP Entities by a network management apparatus according to an embodiment of the present invention.

Next, as details of S12, the search for PP Entities will be described. FIG. 26 is a flowchart illustrating an example of a processing procedure for a search for PP Entities by a network management apparatus according to an embodiment of the present invention.

The physical resource search unit 15 acquires endPointList that the failure pass Entities (LC or NC) have from the Entity DB 13 (S12*a*). Note that at S12*a*, a failure pass Entity (XC) may be designated by an input operation by an operator, and the physical resource search unit 15 may acquire endPointList that this failure pass Entity (XC) has from the Entity DB 13.

The physical resource search unit 15 sets the index "i=1" and performs the processing of S12*b* to S12*d* below until the condition "i<endPointList array length" is satisfied.

The physical resource search unit 15 acquires an instance of a TPE Entity from the index i of the endPointList array from the Entity DB 13 and stores the acquired instance in a tpe instance (instance of TPE Entity) variable (S12*b*).

The physical resource search unit 15 determines whether or not the tpeRefList attribute that the instance of the TPE Entity has is empty (NULL) (S12*c*).

When Yes at S12*c*, the physical resource search unit 15 acquires an instance of a TPE Entity from the endPointList [i] array that the tpe instance variable has from the Entity DB 13, and stores the acquired instance in a tpe instance variable (S12*d*).

After S12*d*, when the above condition is not satisfied, the physical resource search unit 15 sets the index "i=i+1" and returns to S12*b*.

When No at S12*c*, the physical resource search unit 15 acquires an instance of a PP Entity (sometimes referred to as a PP instance) from the ppRefList [i] array that the tpe instance variable has from the Entity DB 13, and stores the acquired instance in a pPort (pp instance variable) (S12*e*).

When the above condition is satisfied after S12*d*, or after S12*e*, the physical resource search unit 15 returns the pPort to S13 (S12*f*), and the process ends.

Figure 27:
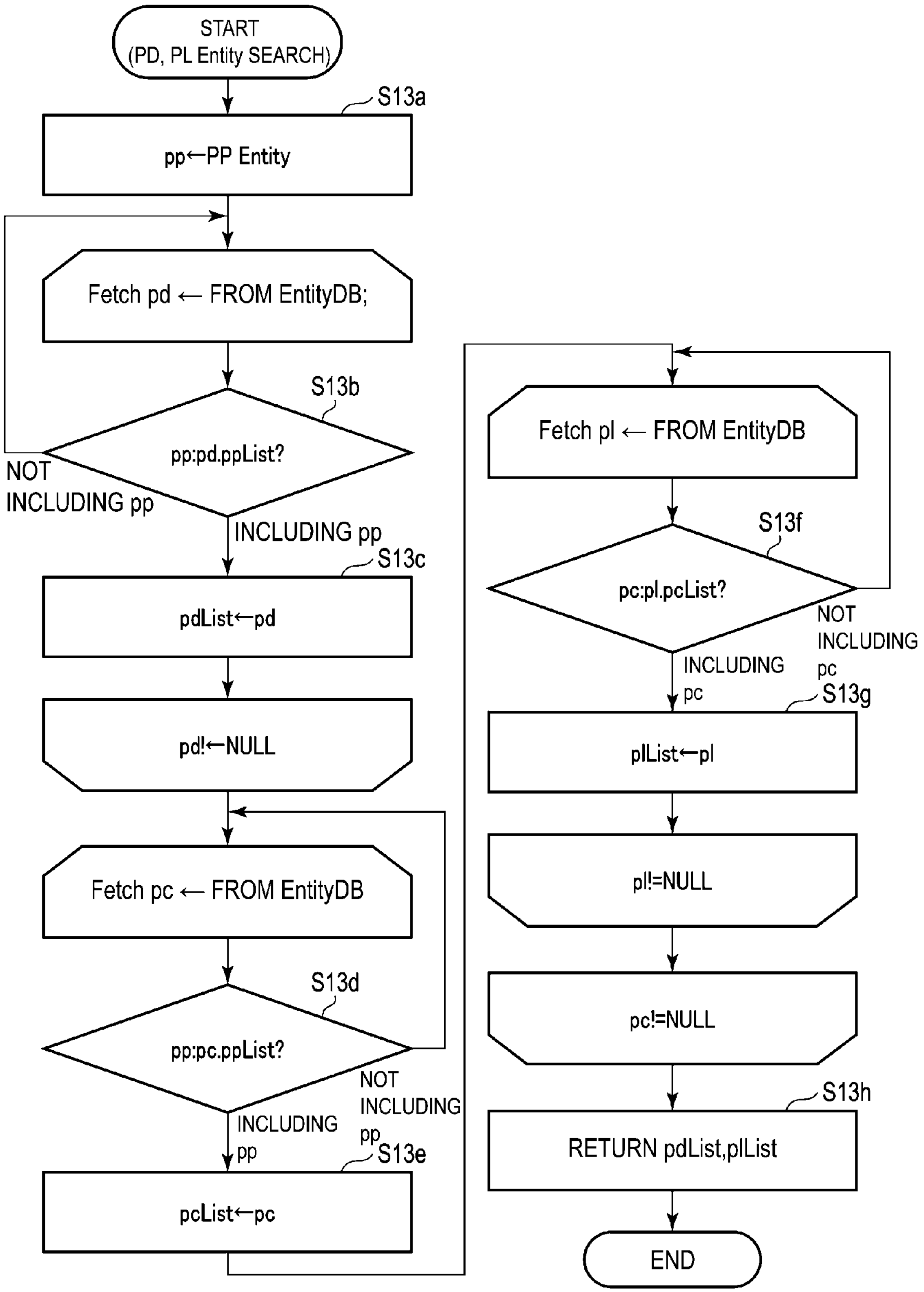
FIG. 27 is a flowchart illustrating an example of a processing procedure for a search for PD and PL Entities by a network management apparatus according to an embodiment of the present invention.

Next, as details of S13, the search for PD and PL Entities having the PP Entities searched for at S12 will be described. FIG. 27 is a flowchart illustrating an example of a processing procedure for a search for PD and PL Entities by a network management apparatus according to an embodiment of the present invention.

The physical resource search unit 15 stores the PP Entities searched for at S12 in a pp instance variable (S13*a*).

The physical resource search unit 15 fetches one record of the array of the PP Entities (pd.ppList array (see FIG. 2)) that the PD Entity has from the Entity DB 13 and stores it in a pd instance (instance of PD Entity) variable.

Then, the physical resource search unit 15 determines whether or not the PP instance searched for at S12 is included in the pd.ppList array (S13*b*).

If Yes at S13*b*, the physical resource search unit 15 stores the PD instance having the PP instance in the pdList array (S13*c*). If No at S13*b*, the physical resource search unit 15 transfers the PP instance to S13*b* related to another record of the pd.ppList array.

After S13*c*, until the condition "pd !=NULL" is satisfied, that is, until there are no more records of the pd.ppList array to be determined, S13*b* and S13*c* are repeated for each record of the pd.ppList array. In this manner, a search for a PD Entity having a PP Entity is performed.

When the above condition "pd !=NULL" is satisfied after S13*c*, the physical resource search unit 15 fetches one record of the array of the PP Entities (pc.ppList array (see FIG. 2)) that the PC Entity has from the Entity DB 13 and stores the one record in a pc instance (instance of PC Entity) variable.

Then, the physical resource search unit 15 determines whether or not the pp instance is included in the pc.ppList array (S13*d*).

If Yes at S13*d*, the physical resource search unit 15 stores the PC instance having the PP instance in the pcList array (S13*e*). If No at S13*d*, the physical resource search unit 15 transfers the PP instance to S13*d* related to another record of the pc.ppList array.

After S13*e*, the physical resource search unit 15 fetches one record of the array of the PC Entities (pl.pcList array (see FIG. 2)) that the PL Entity has from the Entity DB 13 and stores the one record in a pl instance (instance of PL Entity) variable.

Then, the physical resource search unit 15 determines whether or not the pc instance is included in the pl.pcList array (S13*f*).

If Yes at S13*f*, the physical resource search unit 15 stores the PL instance having the PC instance in the plList array (S13*g*). If No at S13*f*, the physical resource search unit 15 transfers the PL instance to S13*f* related to another record of the pl.pcList array.

After S13*g*, until the condition "pl !=NULL" is satisfied, that is, until there are no more records of the pl.pcList array to be determined, S13*f* and S13*g* are repeated for each record of the pl.pcList array. In this manner, a search for a PL Entity having a PC Entity is performed.

The search for the PC Entity having the PP Entity and the search for the PL Entity having the PC Entity are performed individually, and as a result, the search for the PL Entity having the PP Entity is performed.

When the above condition "pl !=NULL" is satisfied after S13*g*, until the condition "pc !=NULL" is satisfied, that is, until there are no more records of the pc.ppList array to be determined, S13*d* and S13*e* are repeated for each record of the pc.ppList array. In this manner, a search for a PC Entity having a PP Entity is performed.

When the condition "pc !=NULL" is satisfied, the physical resource search unit 15 returns the pdList stored in S13*c* to S14 and S16, and returns the plList stored in S13*g* to S15 (S13*h*), and the process ends.

Figure 28:
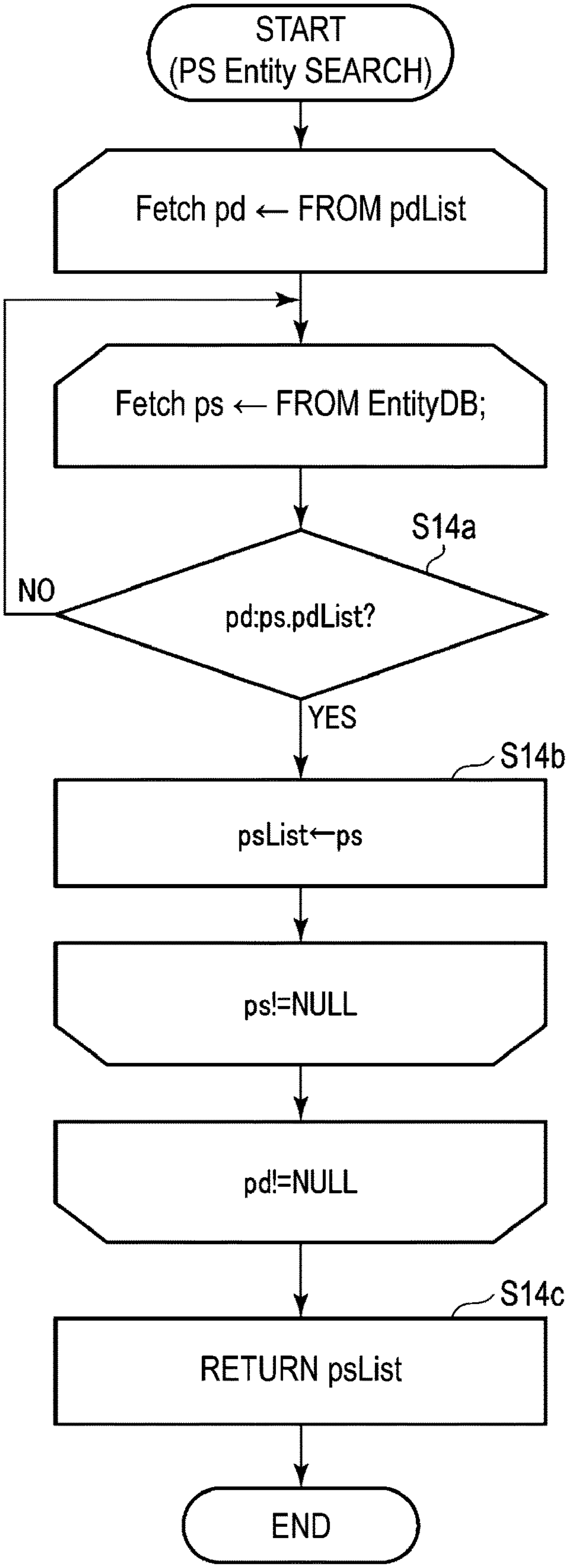
FIG. 28 is a flowchart illustrating an example of a processing procedure for a search for PS Entities by a network management apparatus according to an embodiment of the present invention.

Next, as details of S14, the search for PS Entities that the PD Entities searched for at S13 has will be described. FIG. 28 is a flowchart illustrating an example of a processing procedure for a search for PS Entities by a network management apparatus according to an embodiment of the present invention.

The physical resource search unit 15 fetches one record of the pdList searched for at S13 and stores the one record in a pd instance variable.

The physical resource search unit 15 fetches one record of the array of the PD Entities (ps.pdList array (see FIG. 1)) that the PS Entity has from the Entity DB 13 and stores the one record in a ps instance (instance of PS Entity) variable.

Then, the physical resource search unit 15 determines whether or not the pd instance is included in the ps.pdList array (S14*a*).

If Yes at S14*a*, the physical resource search unit 15 stores the PS instance having the PD instance in the psList array (S14*b*). If No at S14*b*, the physical resource search unit 15 transfers the PS instance to S14*a* related to another record of the ps.pdList array.

After S14*b*, until the condition "ps !=NULL" is satisfied, that is, until there are no more records of the ps.pdList array to be determined, S14*a* and S14*b* are repeated for each record of the ps.pdList array.

When the above condition "ps !=NULL" is satisfied after S14*b*, until the condition "pd !=NULL" is satisfied, that is, until there are no more records of the target pdList, S14*a* and S14*b* are repeated for each record of the pdList. In this manner, a search for a PS Entity having a PD Entity is performed.

When the condition "pd !=NULL" is satisfied, the physical resource search unit 15 returns the psList to S16 (S14*c*), and the process ends.

Figure 29:
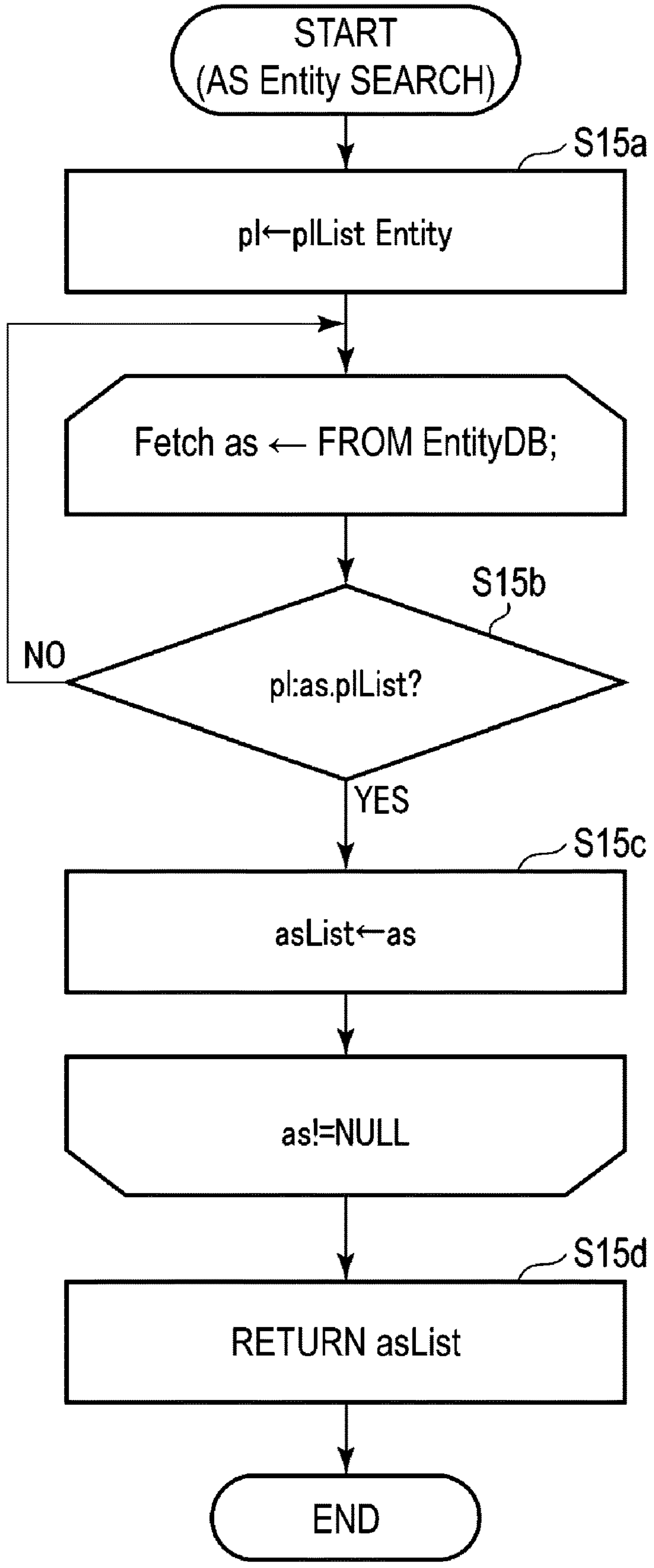
FIG. 29 is a flowchart illustrating an example of a processing procedure for a search for AS Entities by a network management apparatus according to an embodiment of the present invention.

Next, as details of S15, the search for AS Entities having the PL Entities searched at S13 will be described. FIG. 29 is a flowchart illustrating an example of a processing procedure for a search for AS Entities by a network management apparatus according to an embodiment of the present invention.

The physical resource search unit 15 stores the plList Entities searched for at S13 in a pl instance variable (S15*a*).

The physical resource search unit 15 fetches one record of the array of the PL Entities (as.plList array) that the AS Entity has, from the Entity DB 13 and stores the one record in an as instance (instance of AS Entity) variable.

Then, the physical resource search unit 15 determines whether or not the pl instance is included in the as.plList array (S15*b*).

If Yes at S15*b*, the physical resource search unit 15 stores the AS instance having the PL instance in the asList array (S15*c*). If No at S15*c*, the physical resource search unit 15 transfers the AS instance to S15*b* related to another record of the as.plList array.

After S15*c*, until the condition "as !=NULL" is satisfied, that is, until there are no more records of the as.plList array to be determined, S15*b* and S15*c* are repeated for each record of the as.plList array.

When the condition "as !=NULL" is satisfied after S15*c*, the physical resource search unit 15 returns the asList to S16 (S15*d*), and the process ends. In this manner, a search for an AS Entity having a PL Entity is performed. Then, as S16 as described above, the physical resource search unit 15 stores the pdList, the psList, and the asList acquired at S13 to S15 in the failure location Entity array.

Figure 30:
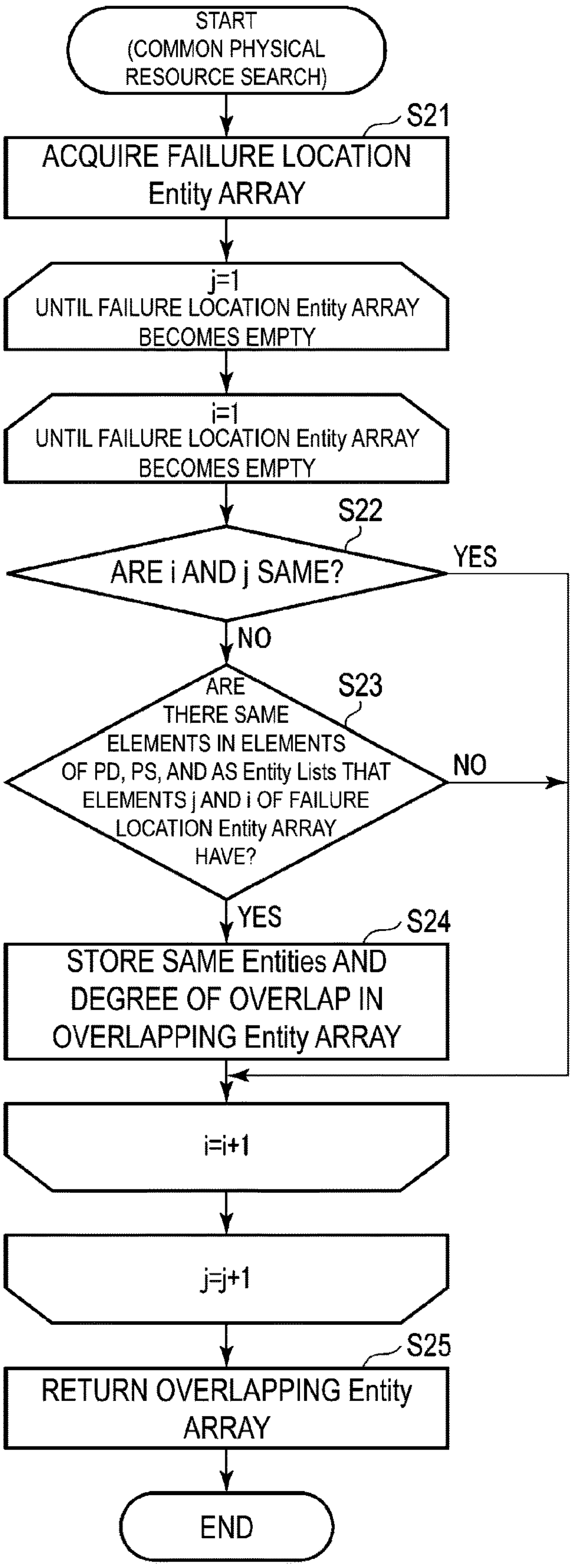
FIG. 30 is a flowchart illustrating an example of a processing procedure for a search for commonly utilized physical resources by a network management apparatus according to an embodiment of the present invention.

Next, a search for physical resources that are commonly utilized by a plurality of failure passes will be described. FIG. 30 is a flowchart illustrating an example of a processing procedure for a search for commonly utilized physical resources by a network management apparatus according to an embodiment of the present invention.

The physical resource search unit 15 acquires the failure location Entity array stored at S16 from the Entity DB 13 (S21).

The physical resource search unit 15 sets the respective indices "j=1" and "i=1", and repeats S22 to 24 below until the condition that the element j of an array to be processed of the acquired failure location Entity array becomes empty and the condition that the element i of an array to be processed of the acquired failure location Entity array becomes empty are satisfied.

If i and j are not the same (No at S22), the physical resource search unit 15 determines whether or not there are the same elements in the PD, PS, and AS EntityList arrays corresponding to elements i and j of the failure location Entity array (S23).

When Yes at S23, the physical resource search unit 15 stores the Entities determined to be the same elements and the degree of overlap related to the Entities in the overlapping Entity array to be processed (S24).

After S24, when No at S23, or when Yes at S22, and when the above condition related to the index i is not satisfied, the physical resource search unit 15 sets the index "i=i+1" and returns to S22.

When the above condition related to the index i is satisfied but the above condition related to the index j is not satisfied, the physical resource search unit 15 sets the index "j=j+1" and returns to S22.

After S24, when the above condition related to the indexj and the above condition related to the index i are satisfied, the physical resource search unit 15 returns the Entities determined to be the same elements and the overlapping Entity array in which the degree of overlap related to the Entities is stored, and the process ends. In this manner, a search for physical resources that are commonly utilized by a plurality of failure passes is performed.

FIG. 31 is a diagram illustrating, in a tabular form, an example of types of arrays of overlapping Entities applied by a network management apparatus according to an embodiment of the present invention.

The types of overlapping Entities of the overlapping Entity array and the degree of overlap are as follows.

(1) Overlapping Entity: Object (2) Degree of overlap: Int

FIG. 32 is a diagram illustrating, in a tabular form, an example of an array of failure location Entities applied by a network management apparatus according to an embodiment of the present invention.

The failure pass Entity Name, the PS EntityList, the AS EntityList, and the PD EntityList related to the array index "1" in the failure location Entity array illustrated in FIG. 32 are as follows.

Failure pass Entity Name: FRE_LC(OTN)_2
PS EntityList: PS_A, PS_D
AS EntityList: AS_2
PD EntityList: PD_OTN_3, PD_OTN_4

The failure pass Entity Name, the PS EntityList, the AS EntityList, and the PD EntityList related to the array index "2" in the failure location Entity array illustrated in FIG. 32 are as follows.

Failure pass Entity Name: FRE_LC(OTN)_3
PS EntityList: PS_A, PS_F
AS EntityList: AS_2
PD EntityList: PD_OTN_5, PD_OTN_6

In this example, for the PS EntityList and the AS EntityList, PS_A and AS_2 overlap between the array indices "1" and "2" (see a and b in FIG. 32), and these correspond to the physical resources commonly utilized by the plurality of failure passes (FRE_LC(OTN)_2 and FRE_LC(OTN)_3). Note that, in the example described above, the PD EntityList does not overlap between the array indices "1" and "2" (see c in FIG. 32).

The NW configuration display unit 16 emphasizes and displays the drawing objects corresponding to the physical resources searched for by the physical resource search unit 15 at S12 to S15 to be distinguished from drawing objects corresponding to other resources in the network configuration, for example, by distinguishing the colors on the screen.

For example, the NW configuration display unit 16 acquires all Entities of the facility layer and the physical layer in the network configuration from the Entity DB 13, and acquires Spec information corresponding to all the Entities from the Spec DB 12 as a Spec array.

The NW configuration display unit 16 acquires two-dimensional coordinates (see FIG. 1 to 3) indicating the position of each Entity from the Entity DB 13, and displays the drawing objects of the facility layer and the physical layer at positions corresponding to the acquired coordinates in the screen. Note that drawing based on coordinate information of an object is also described in JP 2018-034981.

Here, the NW configuration display unit 16 acquires two-dimensional coordinates indicating the positions of PD, PS, and AS Entities stored in the failure location Entity array at S16 among the two-dimensional coordinates described above, and emphasizes and displays the drawing objects at the positions to be distinguished from other objects, for example, with red color.

The NW configuration display unit 16 can emphasize and display the drawing objects corresponding to the physical resources (the physical layer and the facility layer) utilized by the plurality of failure passes described above among the drawing objects described above, to be distinguished from other objects, for example, with blue color. The color to be emphasized and displayed may be distinguished depending on the magnitude of the degree of overlap.

Figure 33:
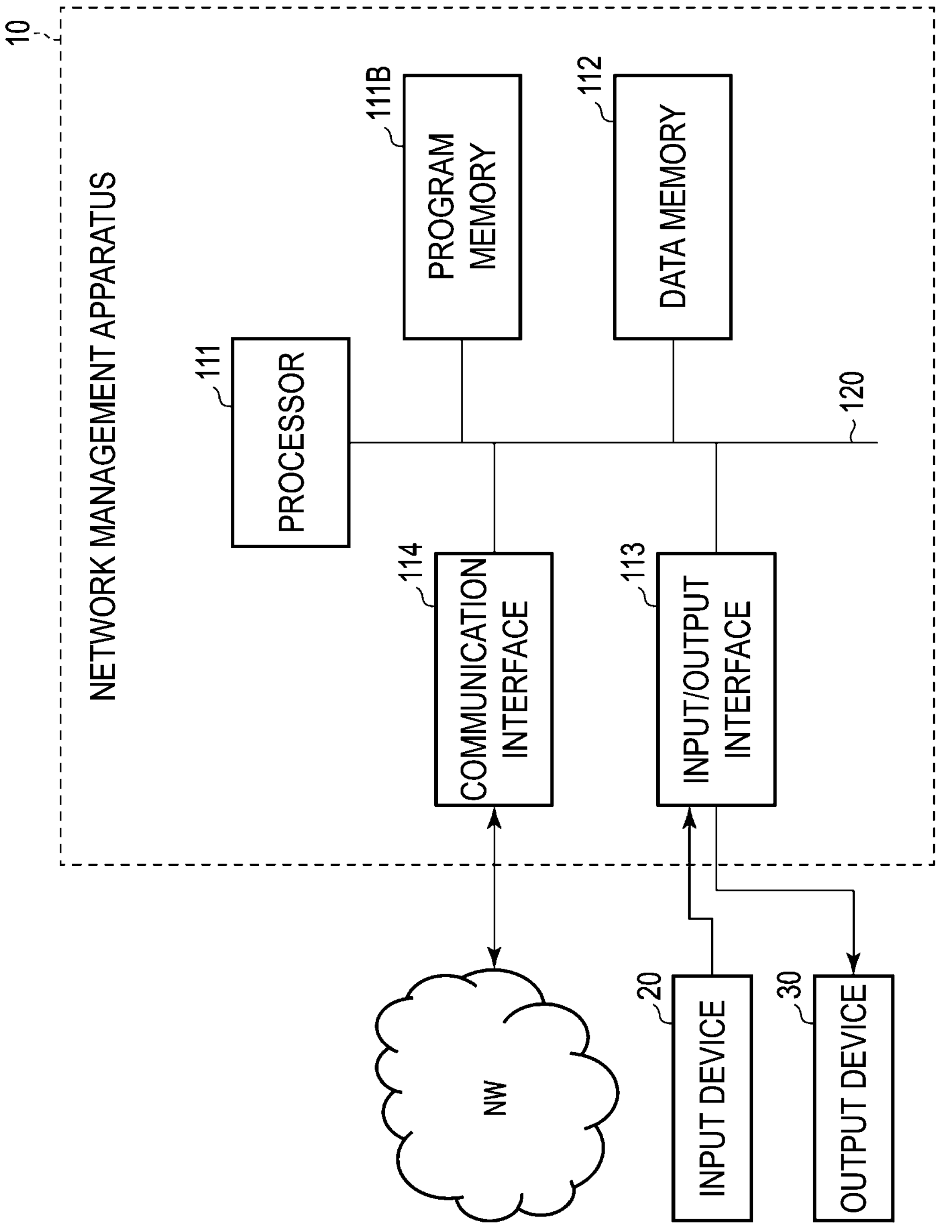
FIG. 33 is a block diagram illustrating an example of a hardware configuration of a network management apparatus according to an embodiment of the present invention.

FIG. 33 is a block diagram illustrating an example of a hardware configuration of a network management apparatus according to an embodiment of the present invention.

In the example illustrated in FIG. 33, the network management apparatus 10 according to the embodiments described above includes a server computer or a personal computer, for example, and has a hardware processor 111A such as a CPU. Then, a program memory 111B, a data memory 112, an input and output interface 113, and a communication interface 114 are connected to the hardware processor 111A via a bus 120.

The communication interface 114 includes, for example, one or more wireless communication interface units to allow transmission/reception of information to/from a communication network NW. As the wireless interface, for example, an interface adopting a small power wireless data communication standard such as a wireless Local Area Network (LAN) is used.

An input device 20 and an output device 30 for the operator additionally provided for the network management apparatus 10 are connected to the input and output interface 113. The input and output interface 113 performs processing of taking operation data input by the operator through the input device 20 such as a keyboard, a touch panel, a touchpad, or a mouse and outputting the output data to the output device 30 including a display device using liquid crystal or organic Electro Luminescence (EL) and causing the output device 30 to display the output data. Note that, as the input device 20 and the output device 30, devices incorporated in the network management apparatus 10 may be used, or an input device and an output device of another information terminal may be used that are capable of communicating with the network management apparatus 10 via the network NW.

For the program memory 1111B, a non-volatile memory that always allows writing and reading, such as a Hard Disk Drive (HDD) or a Solid State Drive (SSD) and a non-volatile memory such as a Read Only Memory (ROM), for example, are used in combination as a non-transitory tangible storage medium, and a program necessary to execute various kinds of control processing according to the embodiment is stored therein.

For the data memory 112, for example, the aforementioned non-volatile memory and a volatile memory such as a Random Access Memory (RAM) are used in combination as a tangible recording medium, and the data memory 112 is used to store various kinds of data acquired and created in the process of performing various kinds of processing.

A network management apparatus 10 according to an embodiment of the present invention is configured as a data processing device including a facility information registration unit 11, a Spec DB 12, an Entity DB 13, a failure pass Entity acquisition unit 14, a physical resource search unit 15, and an NW configuration display unit 16, illustrated in FIG. 13, as processing function units by software.

The Spec DB 12 and the Entity DB 13 can be constituted using a data memory 112 illustrated in FIG. 33. However, these regions are not essential configurations in the network management apparatus 10 and may be regions provided in a storage device such as an external storage medium such as a Universal Serial Bus (USB) memory or a database server or the like arranged in a cloud, for example.

All the processing function units of the facility information registration unit 11, the failure pass Entity acquisition unit 14, the physical resource search unit 15, and the NW configuration display unit 16 described above can be implemented by causing the hardware processor 111A to read and execute a program stored in the program memory 111B. Note that some or all of the processing function units may be implemented by other various methods including an integrated circuit such as an Application Specific Integrated Circuit (ASIC) or a Field-Programmable Gate Array (FPGA).

As described above, a network management apparatus according to an embodiment of the present invention can identify candidates for a facility that has caused a failure by searching for objects of a physical layer and a facility layer corresponding to failure passes when a failure occurs on a logical layer of a communication network.

The network management apparatus can also search for objects of the physical layer and the logical layer commonly utilized by a plurality of failure passes when a failure occurs in a plurality of passes.

A method described in each embodiment can be stored in a recording medium such as a magnetic disk (a Floppy (registered trademark) disk, a hard disk, or the like), an optical disc (a CD-ROM, a DVD, an MO, or the like), a semiconductor memory (a ROM, a RAM, a Flash memory, or the like), for example, and can be transferred and distributed by a communication medium, as a program (a software unit) that a computing device (computer) can be caused to execute. Note that the program stored on the medium side includes a setting program for causing a software means (including not only an execution program but also a table and a data structure) that the calculator is caused to execute to be configured in the calculator. The calculator in which the present device is implemented executes the aforementioned processing by reading the program recorded in the recording medium, constructing the software means using the setting program in some cases, and causing the software means to control operations. Note that the recording medium referred to herein is not limited to a recording medium for distribution but includes a storage medium such as a magnetic disk or a semiconductor memory provided in the calculator or a device connected thereto via a network.

It is to be noted that the present invention is not limited to the aforementioned embodiments and can be variously modified in the implementation stage without departing from the gist of the present invention. An appropriate combination of the embodiments can also be implemented, in which a combination of their effects can be obtained. Further, the above embodiments include various disclosures, which can be designed by combining constituent elements selected from a plurality of constituent elements disclosed here. For example, a configuration in which some constituent elements are removed from all the constituent elements illustrated in the embodiments can be designed as an invention if the problems can be solved and the effects can be achieved.

REFERENCE SIGNS LIST

11 Facility information registration unit
12 Spec database (DB)
13 Entity DB
14 Failure pass Entity acquisition unit
15 Physical resource search unit
16 NW configuration display unit

The invention claimed is:

1. A network management apparatus comprising:

a storage device configured to store information indicating a correspondence relationship between information objects related to a logical layer, information objects related to a physical layer in a network configuration, and information objects related to a facility layer which are objects in which the information objects related to the physical layer are housed;

an acquisition unit configured to acquire an information object related to an occurrence path of a failure in the logical layer of the network configuration, from the storage device; and a search unit configured to search for, among the information objects related to the facility layer stored in the storage device, an information object related to the facility layer and the physical layer associated with the information object related to the occurrence path of the failure acquired from the acquisition unit, as a candidate for a facility that causes the failure.

2. The network management apparatus according to claim 1, wherein:

the information objects related to the facility layer include a first object indicating a facility in which a communication device is housed, and a second object indicating a facility in which a communication medium is housed, the information objects related to the physical layer include a port object indicating a communication port attached to a communication device, a device object indicating a communication device including the communication port, and a medium object indicating a communication medium connectable to the communication port, the information objects related to the logical layer include a plurality of point objects indicating a generating location or a termination of a communication and a line object including the plurality of point objects, the correspondence relationship between the information objects related to the logical layer and the information objects related to the physical layer includes a correspondence relationship between the plurality of point objects and the port object, the correspondence relationship between the information objects related to the physical layer and the information objects related to the facility layer includes a correspondence relationship between the device object and the first object and a correspondence relationship between the medium object and the second object, and the search unit is configured to search for one of the plurality of point objects that terminates a line object in the logical layer, the one of the plurality of point objects corresponding to the occurrence path of the failure, search for the port object in the physical layer, the port object corresponding to the one of the plurality of point objects searched out, search for the device object and the medium object belonging to the port object, search for the first object in the facility layer, in which the device object is housed, search for the second object in the facility layer, in which the medium object is housed, and identify the first object and the second object searched out, as candidates for a facility that causes the failure.

3. The network management apparatus according to claim 1, wherein the acquisition unit is configured to acquire information objects related to a plurality of occurrence paths of a failure in the logical layer of the network configuration, from the storage device, and the search unit is configured to search for an information object that is commonly associated with information objects related to two or more of the occurrence paths of the failure in the information objects searched out.

4. The network management apparatus according to claim 3, further comprising a display processing unit configured to emphasize and display the information object that is commonly associated with the information objects related to the two or more of the occurrence paths of the failure searched out by the search unit, with respect to other information objects.

5. A network management method performed by a network management apparatus including a storage device storing information indicating a correspondence relationship between information objects related to a logical layer, information objects related to a physical layer in a network configuration, and information objects related to a facility layer which are objects in which the information objects related to the physical layer are housed, the network management method comprising:

acquiring an information object related to an occurrence path of a failure in the logical layer of the network configuration from the storage device; and searching for, among the information objects related to the facility layer stored in the storage device, an information object related to the facility layer and the physical layer associated with the information object acquired related to the occurrence path of the failure, as a candidate for a facility that causes the failure.

6. The network management method according to claim 5, wherein the information objects related to the facility layer include a first object indicating a facility in which a communication device is housed, and a second object indicating a facility in which a communication medium is housed, the information objects related to the physical layer include a port object indicating a communication port attached to a communication device, a device object indicating a communication device including the communication port, and a medium object indicating a communication medium connectable to the communication port, the information objects related to the logical layer include a plurality of point objects indicating a generating location or a termination of a communication and a line object including the plurality of point objects, the correspondence relationship between the information objects related to the logical layer and the information objects related to the physical layer includes a correspondence relationship between the plurality of point objects and the port object, the correspondence relationship between the information objects related to the physical layer and the information objects related to the facility layer includes a correspondence relationship between the device object and the first object and a correspondence relationship between the medium object and the second object, and the searching including searching for one of the plurality of point objects that terminates a line object in the logical layer, the one of the plurality of point objects corresponding to the occurrence path of the failure, searching for the port object in the physical layer, the port object corresponding to the one of the plurality of point objects searched out, searching for the device object and the medium object belonging to the port object, searching for the first object in the facility layer, in which the device object is housed, searching for the second object in the facility layer, in which the medium object is housed, and identifying the first object and the second object searched out, as candidates for a facility that causes the failure.

7. The network management method according to claim 5, wherein the acquiring includes acquiring information objects related to a plurality of occurrence paths of a failure in the logical layer of the network configuration from the storage device, and the searching includes searching for an information object that is commonly associated with information objects related to two or more of the occurrence paths of the failure, in the information objects searched out.

8. A non-transitory computer-readable medium having computer-executable instructions that, upon execution of the instructions by a processor of a computer, cause the computer to function as the network management apparatus according to claim 1.

9. A network management apparatus comprising:

a storage device configured to store information indicating a correspondence relationship between information objects related to a logical layer, information objects related to a physical layer in a network configuration, and information objects related to a facility layer which are objects in which the information objects related to the physical layer reside are housed, wherein the facility layer identifies a physical structure that houses the information objects related to the physical layer;

an acquisition unit configured to acquire an information object related to an occurrence path of a failure in the logical layer of the network configuration, from the storage device; and a search unit configured to search for, among the information objects related to the facility layer stored in the storage device, an information object related to the facility layer and the physical layer associated with the information object related to the occurrence path of the failure acquired from the acquisition unit, as a candidate for a facility that causes the failure.

* * * * *